US007654385B2

(12) United States Patent
Ledinek et al.

(10) Patent No.: US 7,654,385 B2
(45) Date of Patent: Feb. 2, 2010

(54) MACHINE FOR FRONT JOINING AND STICKING OF OBLONG WOOD WORKPIECES BY TOOTHED FRONT JOINTS AND REFERENTIAL PROCEDURE

(76) Inventors: Gregor Ledinek, Ulica Janka Sernca 47, 2000 Maribor (SI); Pavel Ledinek, Pivolska 31, 2000 Maribor (SI)

( * ) Notice: Subject to any disclaimer, the term of this patent is extended or adjusted under 35 U.S.C. 154(b) by 1625 days.

(21) Appl. No.: 10/413,012

(22) Filed: Apr. 14, 2003

(65) Prior Publication Data

US 2004/0187712 A1 Sep. 30, 2004

(30) Foreign Application Priority Data

Dec. 20, 2002 (SI) ............................ P-200200310

(51) Int. Cl.
*B23D 59/00* (2006.01)
*B27B 1/00* (2006.01)
*B65G 15/20* (2006.01)

(52) U.S. Cl. .................... 198/626.6; 144/28.8; 144/85; 144/253.5

(58) Field of Classification Search ................. 198/624, 198/626.6; 144/350; 156/157, 159, 258, 156/296, 304.1, 304.5
See application file for complete search history.

(56) References Cited

U.S. PATENT DOCUMENTS

| | | | | | |
|---|---|---|---|---|---|
| 3,526,312 | A | * | 9/1970 | Braas | 198/624 |
| 3,927,705 | A | | 12/1975 | Cromeens et al. | |
| 4,041,998 | A | * | 8/1977 | Moorley | 144/347 |
| 4,130,150 | A | * | 12/1978 | Cook et al. | 156/304.5 |
| 4,173,278 | A | * | 11/1979 | Reitter | 198/626.6 |

(Continued)

FOREIGN PATENT DOCUMENTS

| | | |
|---|---|---|
| AU | 482 628 | 4/1977 |

(Continued)

*Primary Examiner*—Douglas A Hess
(74) *Attorney, Agent, or Firm*—McGlew and Tuttle, P.C.

(57) ABSTRACT

Machine for front joining and sticking of oblong wood workpieces by toothed front joints and referential procedure consists of the flow press and entrance conveying line, and solves the problem of simple and quality front joining and sticking of workpieces, which travel through them fast and fluently in a consecutive row, irrespective of possible yet allowed curvature and dimensional deviation. This is enabled by the construction of entrance conveyors and exit conveyors of the conveying line, equipped with mechanisms for adjustment of side chain units, and with elastic couplings, whereby inside the side chain units the elastic insertions are placed, and inside pressing conveyors other elastic insertions are placed. Joints among individual entrance conveyors, among individual exit conveyors, and among conveyors are likewise elastic constructions by means of adjustable screws placed between fixed cantilevers, and between tension cantilevers. It is further enabled by the construction of entrance units and exit units in the flow press, or by the construction of pushing wheel pairs inside them, and which are simultaneously driven by the central driving coupling. For this purpose, each wheel pair is equipped with a pair of flexible cranks, the cylinder for pressure adjustment, the cylinder for position adjustment, the mechanism for interactive distance adjustment. Pushing wheel pairs also have the cylinder for the horizontal shift regulation and the shift-meter with which the force meter is connected, and which is placed at the end of the last pushing wheel pair.

17 Claims, 20 Drawing Sheets

U.S. PATENT DOCUMENTS 4,248,280 A * 2/1981 Taylor ..................... 156/304.5
4,399,619 A * 8/1983 Martin .................... 156/304.1
4,964,446 A * 10/1990 Ledinek ................... 144/114.1
5,617,910 A * 4/1997 Hill ............................ 144/356
6,216,756 B1 * 4/2001 Mason .................... 198/626.6
6,701,984 B2 * 3/2004 Lamontagne et al. ....... 144/350
6,712,197 B2 * 3/2004 Kubota et al. ............... 198/620
6,725,891 B2 * 4/2004 Ledinek et al. ............... 144/91
6,811,647 B1 * 11/2004 Graf et al. ................... 156/264
6,896,019 B2 * 5/2005 Achard et al. ............... 144/357
7,331,267 B2 * 2/2008 Urmson ....................... 83/651

FOREIGN PATENT DOCUMENTS

DE 1 185 799 1/1965
DE 1 185 800 1/1965
DE 4 240 636 6/1993
GB 1 342 170 12/1973

* cited by examiner

SECTION: A-A

DETAIL: F

SECTION: B-B

DETAIL: D

DETAIL: G

DETAIL: H

SECTION: I - I

SECTION: J - J

VIEW: M

DETAIL: L

MACHINE FOR FRONT JOINING AND STICKING OF OBLONG WOOD WORKPIECES BY TOOTHED FRONT JOINTS AND REFERENTIAL PROCEDURE

FIELD OF THE INVENTION

The subject of the invention is a machine for front joining and sticking of oblong wood workpieces by toothed front joints and referential procedure, or more precisely, it is a machine for pressing and sticking of front toothed surfaces, which consists of a flow press with elastically constructed rotary elements, and before a flow press there is placed a conveying line, which consists of several functionally connected conveying surfaces for conveying workpieces, and the position of the individual transmission coupling can in both be adjusted.

BACKGROUND OF THE INVENTION

According to the international patent classification this submitted invention likely belongs to B 30B 3/04, B 30B 5/02, B 65G 15/14, B 65G 17/48 and B 30B 15/16.

There are two basic solutions of the machine or of front joining and sticking of oblong wood workpieces mode respectively, preferentially for toothed front joints, known to us, and which have already for some time been applied. The oldest known solution is constructed on the stroke operation, i.e. intermittent operation. For this purpose, all front toothed surfaces of all workpieces are previously coated by adequate glue, and the machine is equipped with at least two pairs of clamping jaws, one fixed and one movable in the longitudinal direction. In the procedure of front joining and sticking, stroke and in sequence movable oblong workpieces, the fixed jaw duty is to rigidly clamp the leading workpiece tail end. Then, the movable jaw first clamps the leading end of the second workpiece that follows the leading workpiece in the row, and then pushes it towards and tightly by the scarf front surface of the leading workpiece, and in this way and in this place it joins and simultaneously sticks them. However, the procedure runs with at least three intermediate interruptions. The described stroke procedure of consecutive joining and sticking of an optional number of workpieces that follow each other in a row is then repeated in cycles. Weakness or deficiency respectively of this known solution is above all in the machine stroke operation, which fails to allow higher operating capacities, and further, this machine cannot join workpieces, being curved or they deviate from required dimensions, by toothed joints.

In the second known solution, which is otherwise constructed to enable the workpieces in a row front joining flow mode, at least two pressing jaws are consecutively placed on the machine. They both have a duty to press workpieces to the base. Weakness of this known mode is in high or highly increased respectively friction between the workpiece, jaw and sliding base, due to which the workpiece motion speed is decreased, and due to friction there occur thermal losses and consequently working energy losses. Thus, the workpiece that follows the first workpiece has a higher traveling speed, therefore, it catches up the first one, bumps into it, and makes front joints and sticks with it. This working mode requires a high driving energy contribution to perform an efficient work of workpieces front pressing with great thermal losses. The excessive heat arising from high friction should be removed or machine individual parts properly additionally cooled respectively.

There are also known solutions, which include both previously described known modes in one machine, whereby weaknesses of the former and the latter mode are joined.

SUMMARY AND OBJECT OF THE INVENTION

The technical problem solved by this invention is such a construction of the machine to enable a flow procedure of wood workpieces joining and sticking with profile constructed preferentially toothed front joints, irrespective of a possible unevenness or yet allowed axial curvature of workpieces respectively in the longitudinal and/or transversal direction, as well as in the case of workpieces deviation from expected dimensions, all in a routine and uninterrupted sequence with minimum interactive friction and minimum loss of energy.

According to the invention, the problem is resolved by the machine and procedure for front joining and sticking of oblong wood workpieces by toothed front joints and referential procedure, which essentially consists of a flow press with an entrance and exit unit with their own drives and pushing wheel pairs, and it further consists of the entrance conveying line with an entrance and exit conveyor, which follow each other in a row, and are constructed of the adjustable side chain units and of the pressing conveyor with an adjustment mechanism. Further, the invention will be more precisely described in the preferential feasibility example, which follows.

The various features of novelty, which characterize the invention, are pointed out with particularity in the claims annexed to and forming a part of this disclosure. For a better understanding of the invention, its operating advantages and specific objects attained by its uses, reference is made to the accompanying drawings and descriptive matter in which a preferential feasibility example of the invention is illustrated.

DESCRIPTION OF THE PREFERENTIAL FEASIBILITY EXAMPLE

Figure 1:
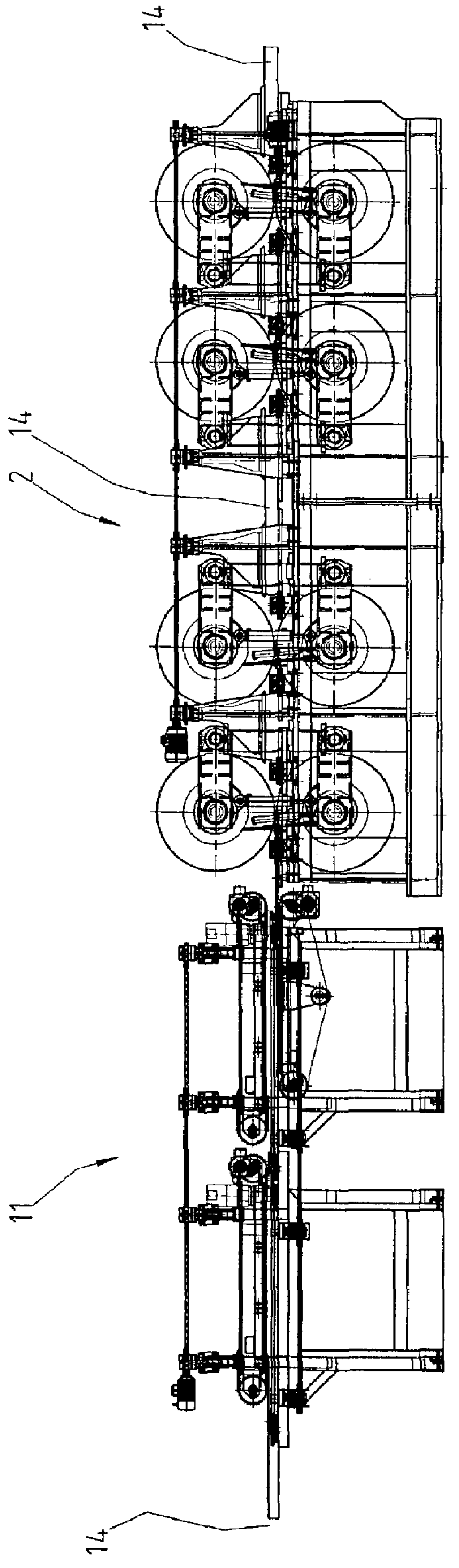
FIG. 1 machine according to the invention, in side view and in orthogonal projection.

Turning now to the drawings, and referring first to the FIG. 1, the machine for front joining and sticking of oblong wood workpieces by toothed front joints is constructed of the entrance conveying line 1 and flow press 2, which follow each other in a row and are interactively transitionally joined in the way that oblong workpieces 14 travel through them fluently and in a given sequence, as a rule in the direction of their longitudinal axes.

Figure 2:
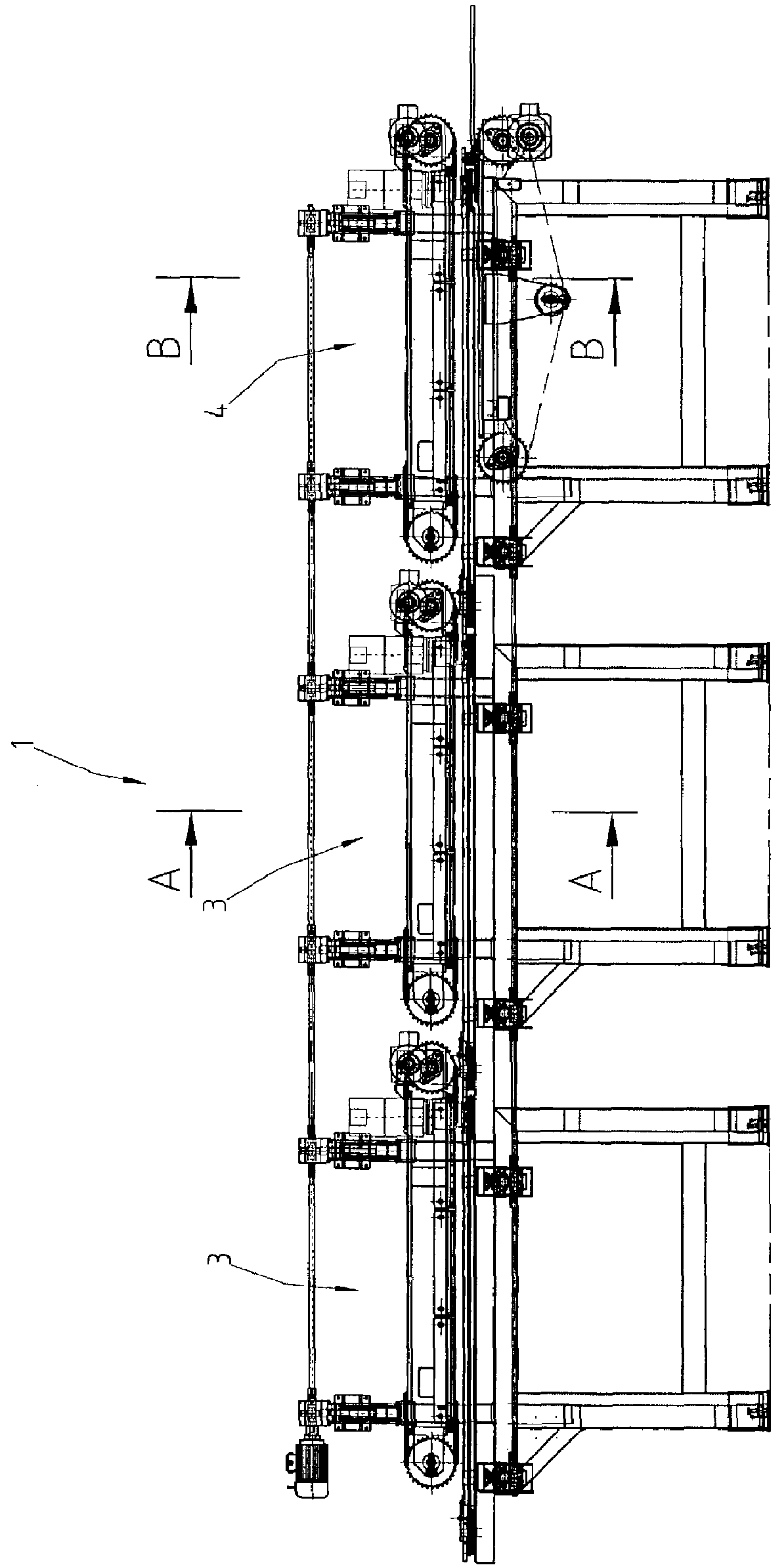
FIG. 2 conveying line according to the invention, in side view and in orthogonal projection.
Figure 3:
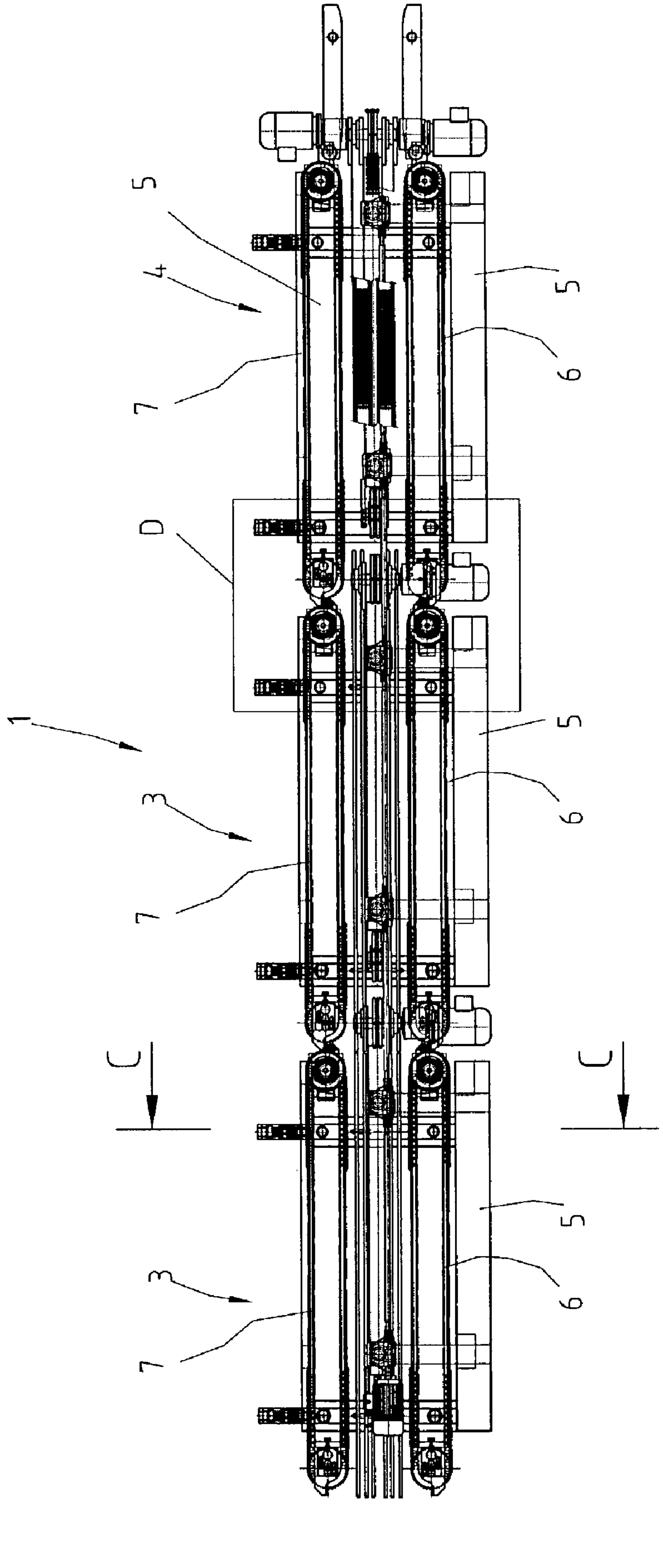
FIG. 3 same as in FIG. 2, but in plan view.
Figure 4:
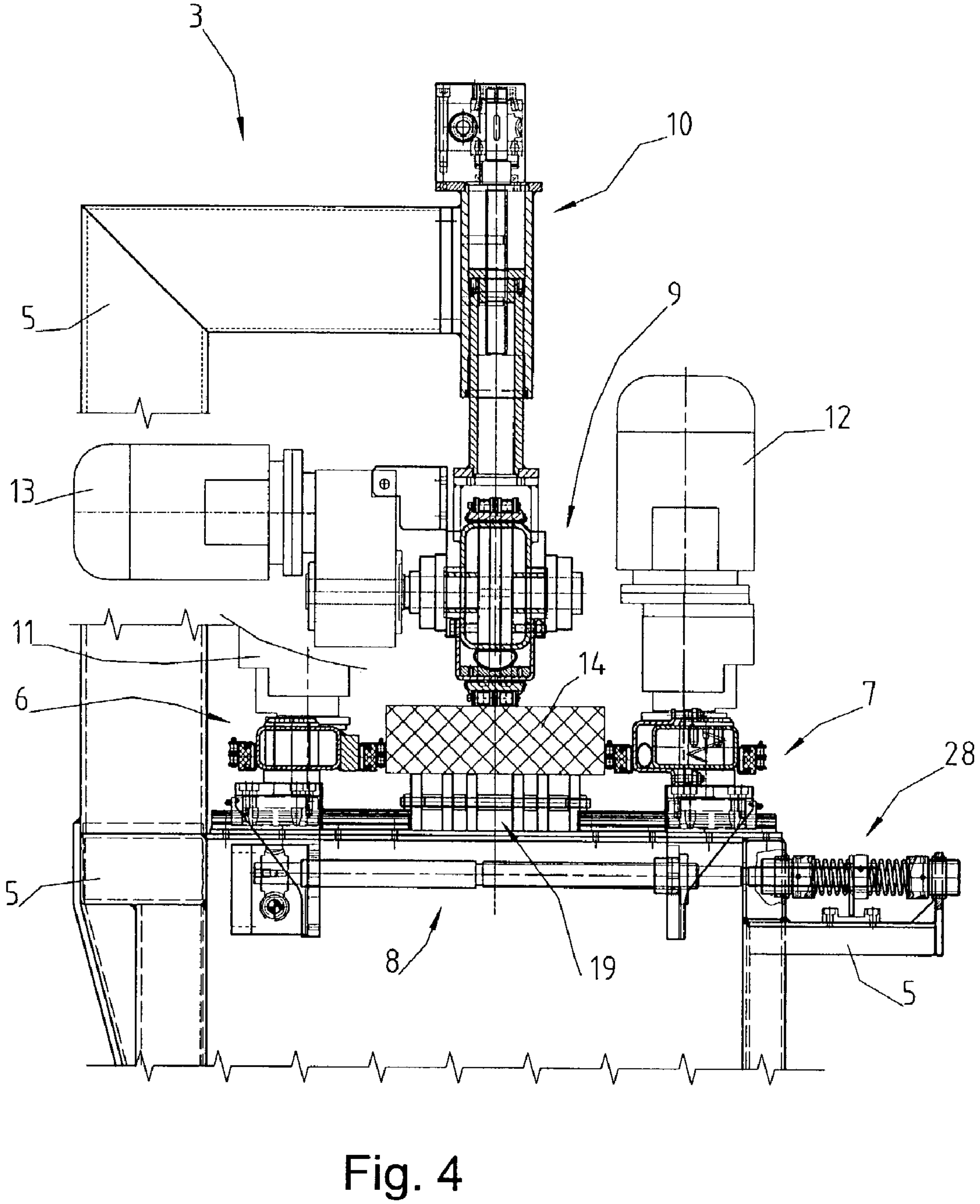
FIG. 4 entrance conveyor of the conveying line in A-A transverse section.

The conveying line 1 is constructed of at least one or more entrance conveyors 3, and as a rule of one but likewise possible of more exit conveyors 4, which follow each other in a row along the same central axis, and as a rule they touch each other. Each entrance conveyor 3 and exit conveyor 4 form side chain units 6 and 7 with the drive 11 and drive 12, and the pressing conveyor 9 with the drive 13, and they are all together placed on the housing 5. Side chain units 6 and 7 of the same type that follow each other in a row, and side chain units 6 and 7 of different type form pairs, which are placed opposite to each other in the interactive spacing. These pairs of side chain units 6 and 7 are placed parallel to the housing 5, and the pressing conveyor 9 is placed parallel to each individual pair. The described is shown in FIG. 2, FIG. 3 and FIG. 4.

Figure 5:
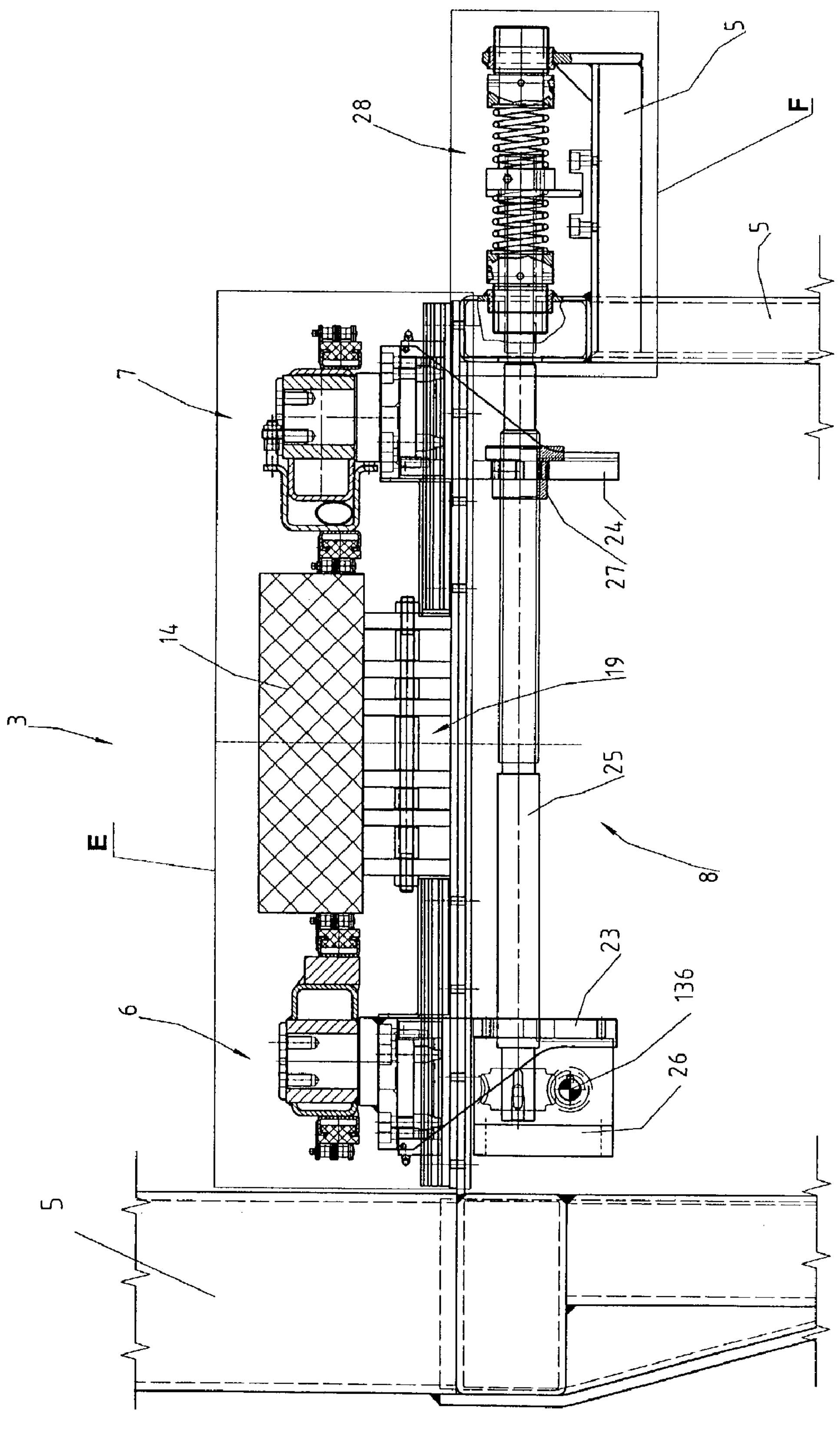
FIG. 5 same as in FIG. 4, but in C-C transverse section.
Figure 6:
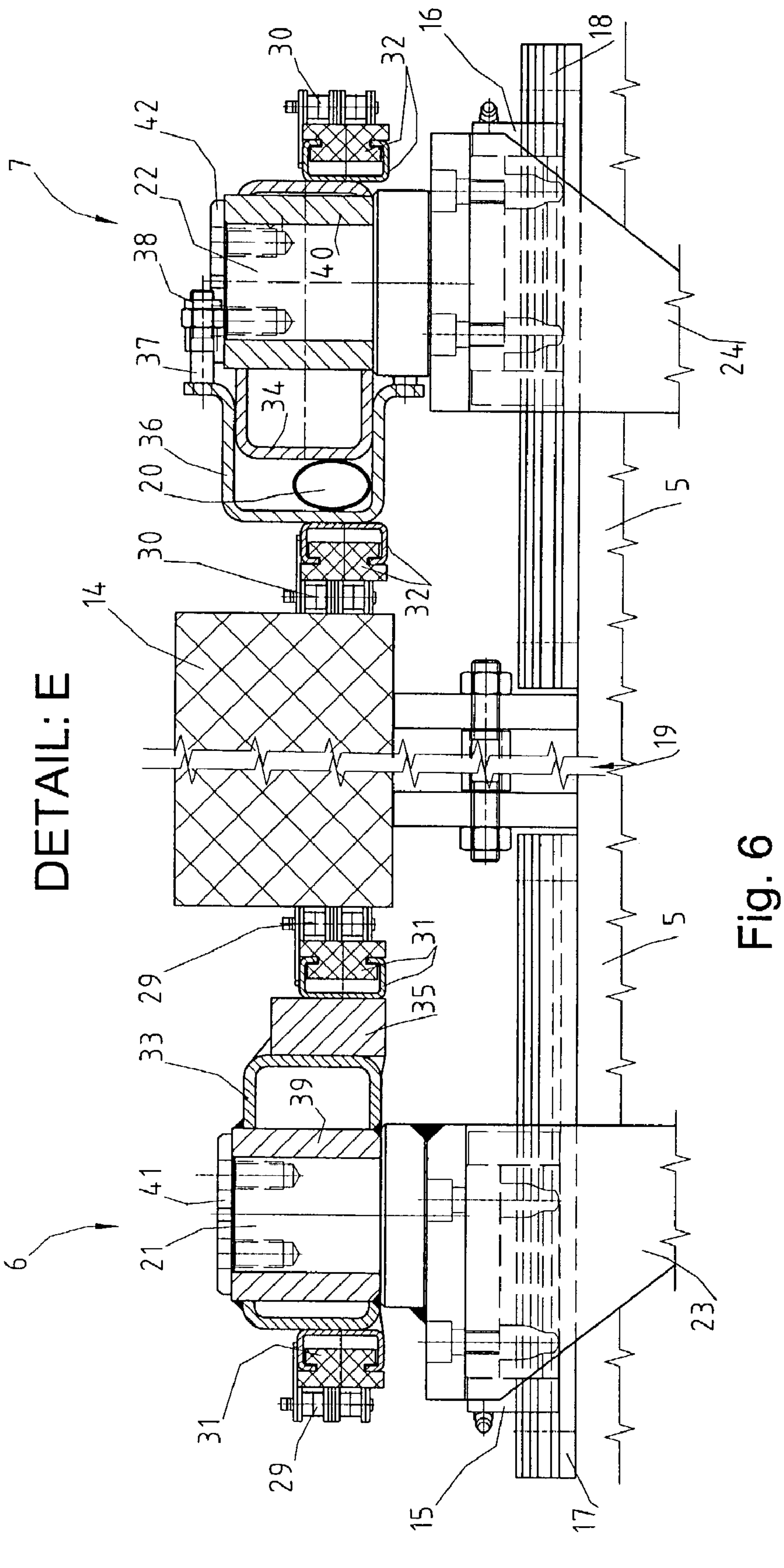
FIG. 6 side chain units of the entrance conveyor with the adjustment mechanism in E detail.

As already said above, side chain units 6 and 7 are placed in pairs, in interactive spacing and in horizontal position to the housing 5 of the entrance conveyor 3. Side chain units 6 are fastened over plain bearings 15 to movable cantilevers 23, and side chain units 7 over plain bearings 16 to movable cantilevers 24 by nuts 27. Side chain units 6 are by means of plain bearings 15 flexibly placed to slides 17, and side chain units 7 by means of plain bearings 16 likewise flexibly to slides 18. Slides 17 and 18 are fixed to the housing 5 in the transverse direction and interactive spacing. Between slides 17 and 18, the bearing laths coupling 19 that runs along the entrance conveyor 3 is placed and fixed to the housing 5. Cantilevers 23 are among them and in the longitudinal direction interconnected with the drive-shaft 136, on which worm gears 26 are placed. Each individual pair of cantilevers 23, 24 is transversally flexibly connected with the mechanism 8 for adjustment of side chain units 6, 7, equipped with the elastic coupling 28. It is in force that each entrance conveyor 3 has at least two mechanisms 8 for adjustment of side chain units 6 and 7, and at least two pressing conveyors 9 with the mechanism 10 for their adjustment. Mechanisms 8 and pressing conveyors 9 are as a rule placed one opposite the other at the right angle. The described is shown in FIG. 5 and FIG. 6.

The side chain unit 6 consists of the fixed pin 21 inserted in the sliding-bush 39 and fastened to the plain bearing 15, and they are both covered by the cover 41. To the sliding-bush 39 there is from the lateral side fixed the frame 33, to which there is from the external side fastened the guide 31 with the endless conveying chain 29. To the internal side of the frame 33 there is fastened the spacing lath 35 with the guide 31 along which there runs the endless conveying chain 29 with the drive 11. Thus, the guide 31 with the endless conveying chain 29 encircles an optional number of sliding-bushes 39 with fixed pins 21 fastened to adjacent plain bearings 15 along the entire length of the entrance conveyor 3.

The side chain unit 7, similar to the previously described side chain unit 6, consists of the fixed pin 22 inserted in the sliding-bush 40 and fastened to the plain bearing 16, and they are both covered by the cover 42. To the sliding-bush 40 there is from the lateral side fixed the frame 34, to which there is from the external side fastened the guide 32 with the endless conveying chain 30 and its drive 12. From the internal side, there is to the frame 34 connected the bearing profile 36, being with one leg fixed to the plain bearing 16, and with the other leg to the linear flexible guide pin 37 with the nut 38. From the external side, there is to the bearing profile 36 fixed the guide 32 along which there runs the endless conveying chain 30. Likewise in this case, the guide 32 and the endless conveying chain 30 encircles an optional number of sliding-bushes 40 with fixed pins 22 fastened to adjacent plain bearings 16 along the entire length of the entrance conveyor 3. In the empty space between the frame 34 and the bearing profile 36, there is placed the elastic insertion 20, preferentially of hollow but likewise possible of filled construction, of optional section, closed on both ends, and as a rule it extends along the entire length of the entrance conveyor 3. In the preferential feasibility example of the invention, the elastic insertion 20 is of hollow oblong pipe construction, functioning on the principle of pneumatics, the hardness or elasticity of which is determined by the air pressure in it. The described is shown in FIG. 4 and FIG. 6. In some other feasibility example, the elastic insertion 20 can be constructed of several pieces, and can also be inserted inside the side chain unit 6, and also inside both side chain units 6 and 7.

Already above mentioned, the mechanism 8 for adjustment of side chain units 6 and 7 essentially consists of the thread spindle 25, which has at one end the worm gear 26 constructed, and at the other free end the elastic coupling 28. The worm gear 26 is in grip with the drive-shaft 136 clamped in the cantilever 23. In the thread spindle 25, there is placed the nut 27 fixedly inserted in the cantilever 24. The described is shown in FIG. 5.

Figure 7:
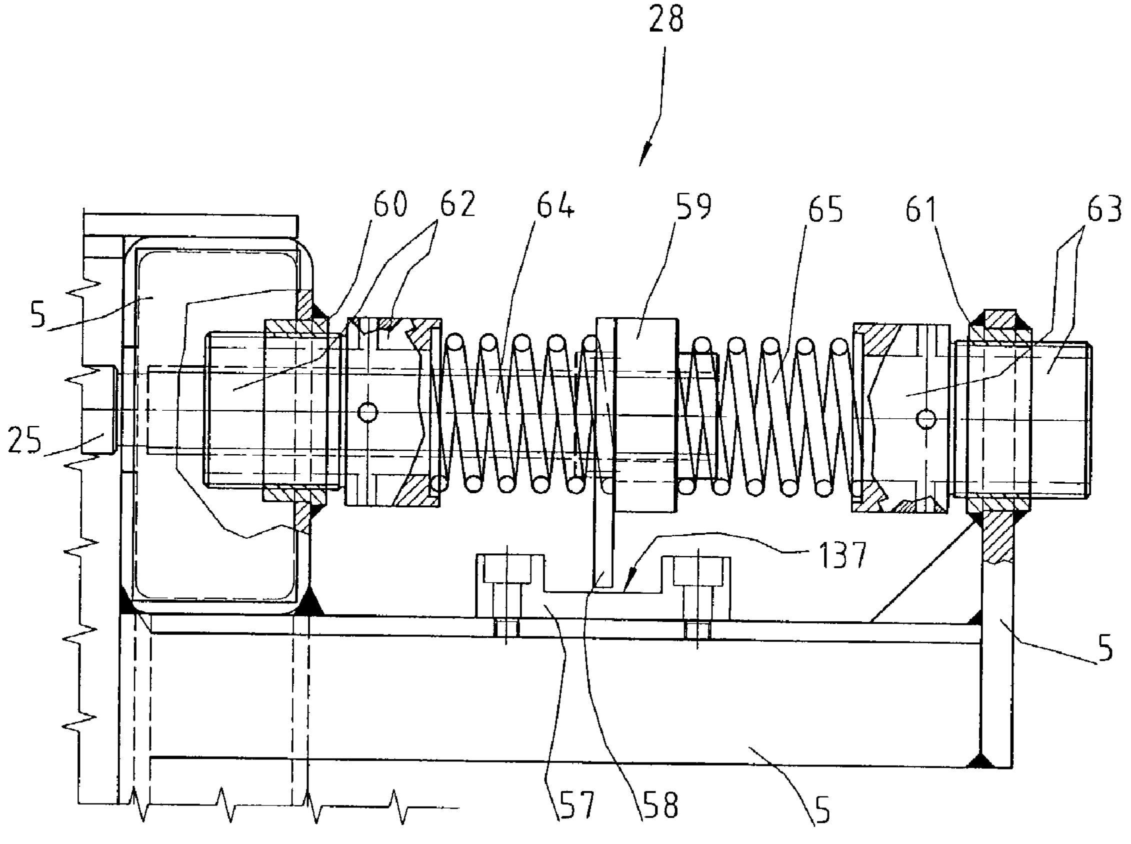
FIG. 7 elastic coupling of the entrance conveyor in side view, F detail.

The elastic coupling 28 is preferentially placed outside the housing 5 of the entrance conveyor 3, whereby the thread spindle 25 runs in the control screw 62 part through the thread bush 60, and its free end with the control screw 63 runs through the thread bush 61. Both thread bushes 60 and 61 are inserted in the housing 5 and fixed in it. On the thread spindle 25 and between the control screws 62 and 63, there are put the pressure springs 64 and 65 separated by the intermediate nut 59 with the crank 58. Under the nut 59, there is to the housing 5 fixed the plate 57 with the groove 137, where into the longer leg of the crank 58 is extended. The described is shown in FIG. 7.

Figure 9:
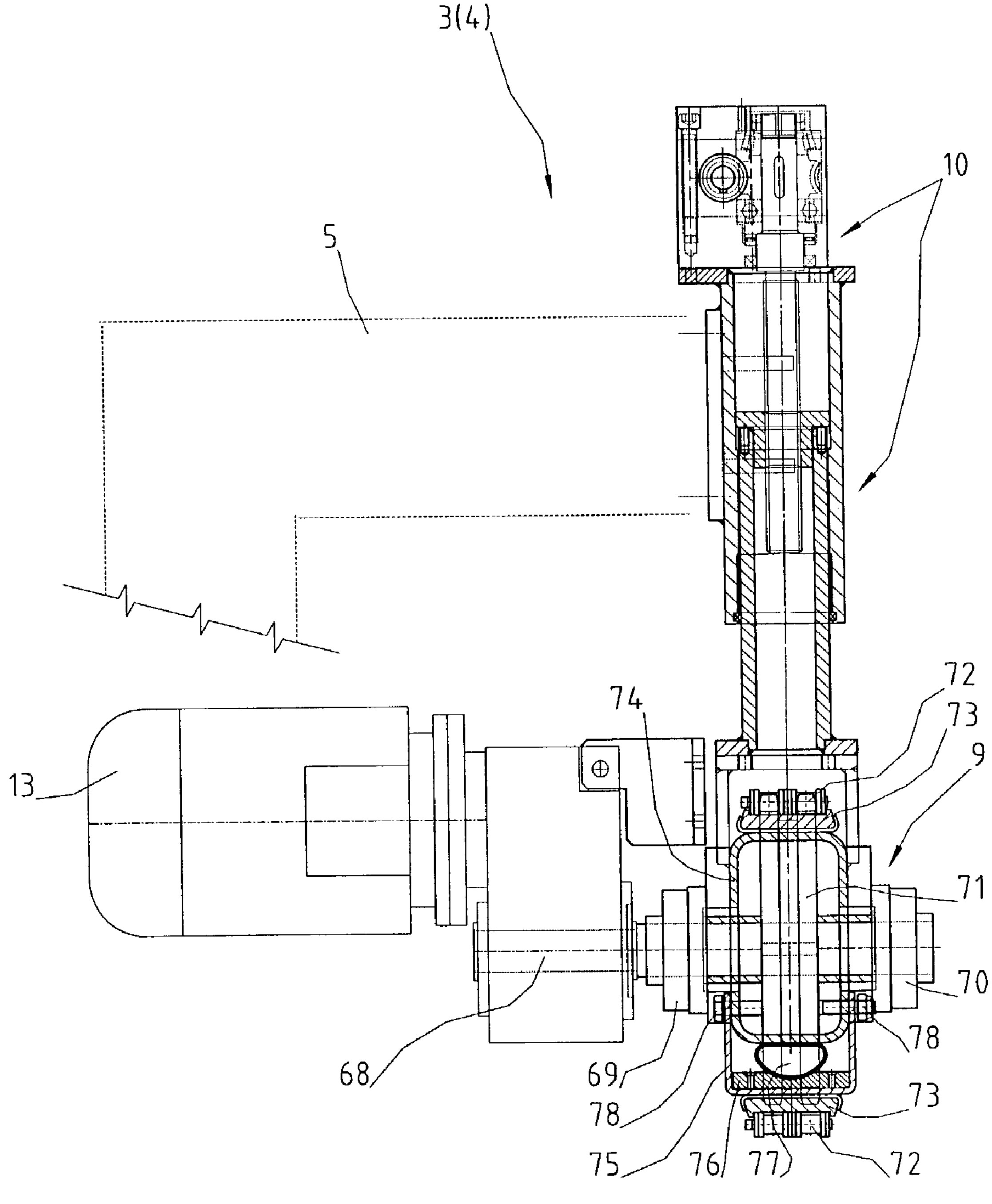
FIG. 9 pressing conveyor with the mechanism to adjust the entrance and/or exit conveyor, in partial longitudinal section.

Perpendicular to the entrance conveyor 3 working surface, or to the bearing laths coupling 19, there is placed the pressing conveyor 9 with the mechanism 10 for its adjustment, being elastically clamped to the housing 5, and driven by the drive 13. The pressing conveyor 9 extends a bit over side chain units 6 and 7, and its longitudinal central axis is as a rule conformable to the vertical central axis of the bearing laths coupling 19. The pressing conveyor 9 is over the chain wheel 71 tightly put by roller bearings 69 and 70 on the drive-shaft 68 of the drive 13. On the frame 74 that encircles the chain wheel 71, there is from the bottom side placed and by the adjustable screw 78 fastened the bearing profile 75 with the spacer 76 on the internal wall. In the empty space between the frame 74 and the spacer 76, there is inserted the elastic insertion 77, for which the same characteristics are in force as previously described for the elastic insertion 20 inside the side chain unit 7. On the external wall of the frame 74 and on the external wall of the bearing profile 75, there is along their entire extent fastened the guide 73, over which there runs the endless conveying chain 72. From the other side, the pressing conveyor 9 is linearly flexibly connected with the mechanism 10 for its adjustment. The described is shown in FIG. 4 and FIG. 9.

Figure 8:
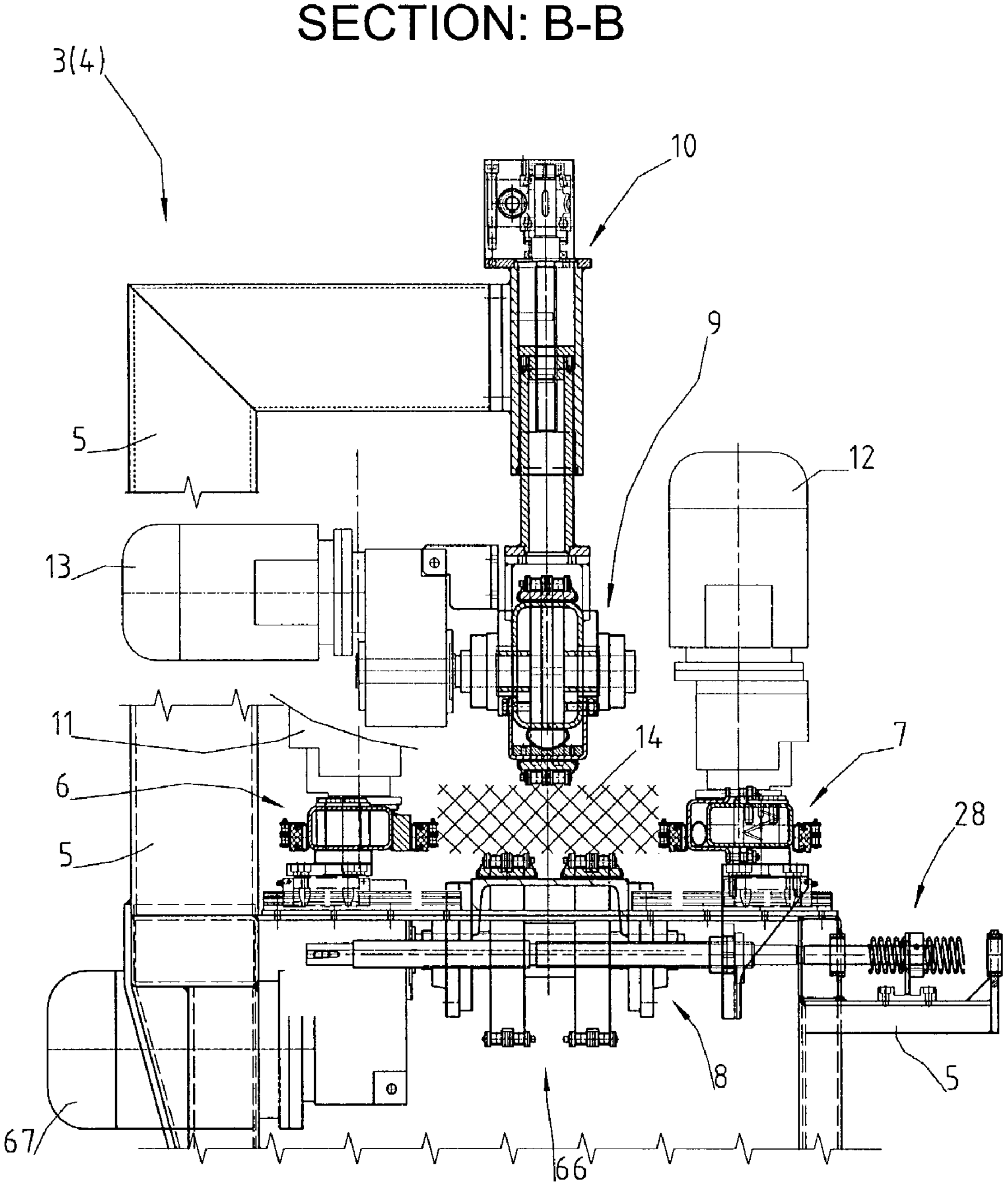
FIG. 8 exit conveyor of the conveying line in B-B transverse section.
Figure 10:
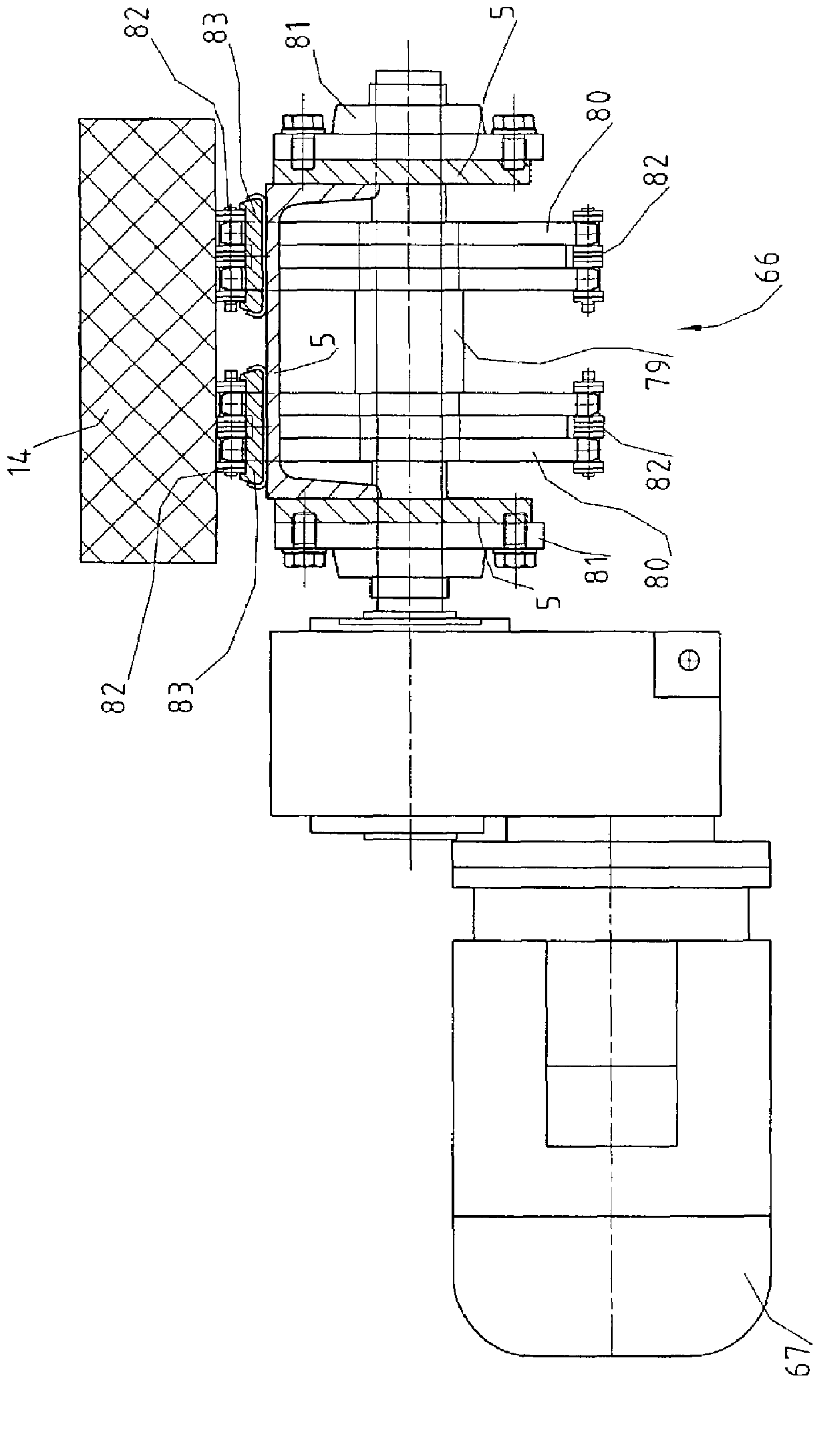
FIG. 10 bearing conveyor of the exit conveyor in transverse section.

In FIG. 8, there is shown the exit conveyor 4, which differs from the entrance conveyor 3 construction only in having on its working surface on the housing 5, between side chain units 6 and 7, and under pressing conveyors 9, constructed also the bearing conveyor 66 driven by one drive 67 at least, what is shown in FIG. 10. On each shaft 79, there is tightly and in spacing put a pair of chain wheels 80, each individually encircled by the endless conveying chain 82. Over the housing 5, there run endless conveying chains 82 inside or on adjacent guides 83, and under the housing 5 directly over chain wheels 80. Each pair of chain wheels 80 is on both sides encircled by the roller bearing 81. A completely equal description is in force for side chain units 6 and 7 with the adjacent mechanism 8 for its adjustment, for elastic couplings 28, and for pressing conveyors 9 with the mechanism 10 for adjustment, which belong to the exit conveyor 4, and which can be traced in the already previously mentioned entrance conveyor 3. For this reason, these descriptions are not repeated.

Figure 11:
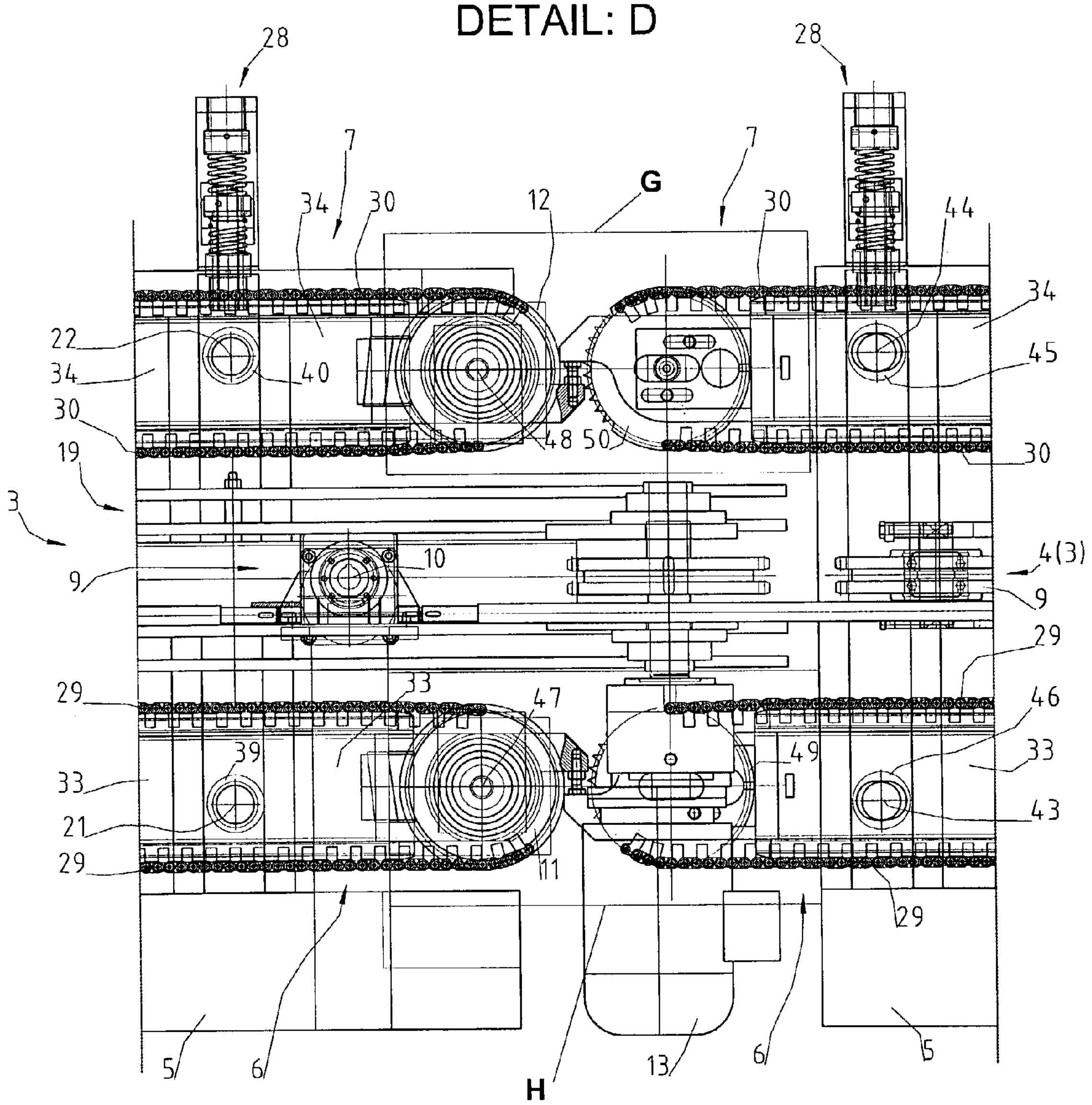
FIG. 11 joint between the entrance and exit conveyor in plan view, D detail.
Figure 12:
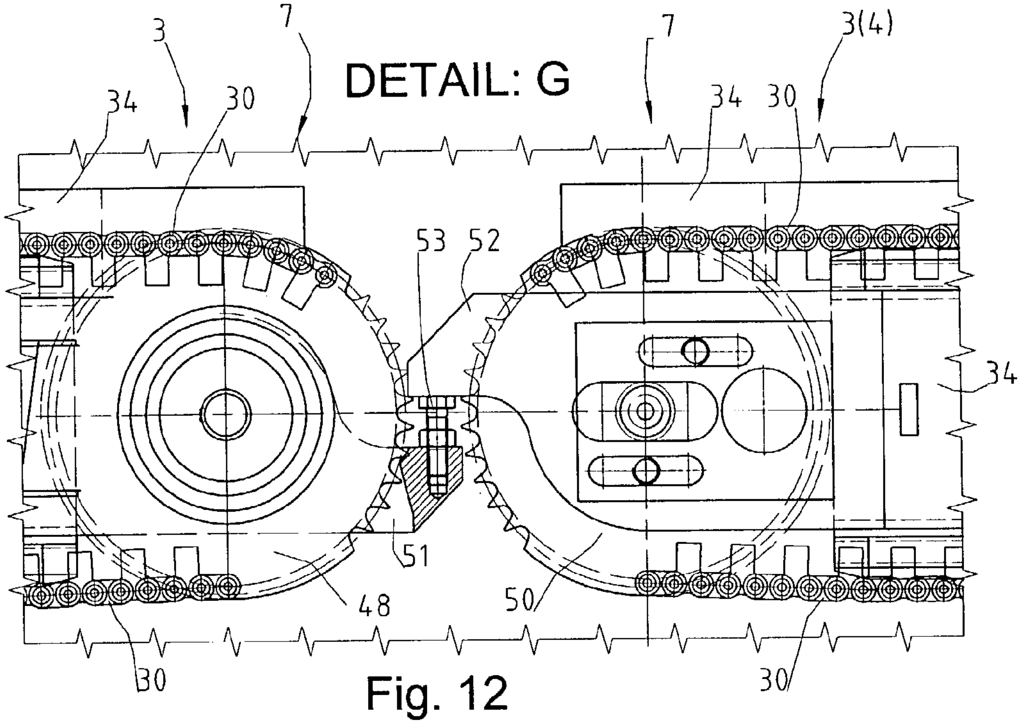
FIG. 12 same as in FIG. 11, but in side view from one side, G detail.
Figure 13:
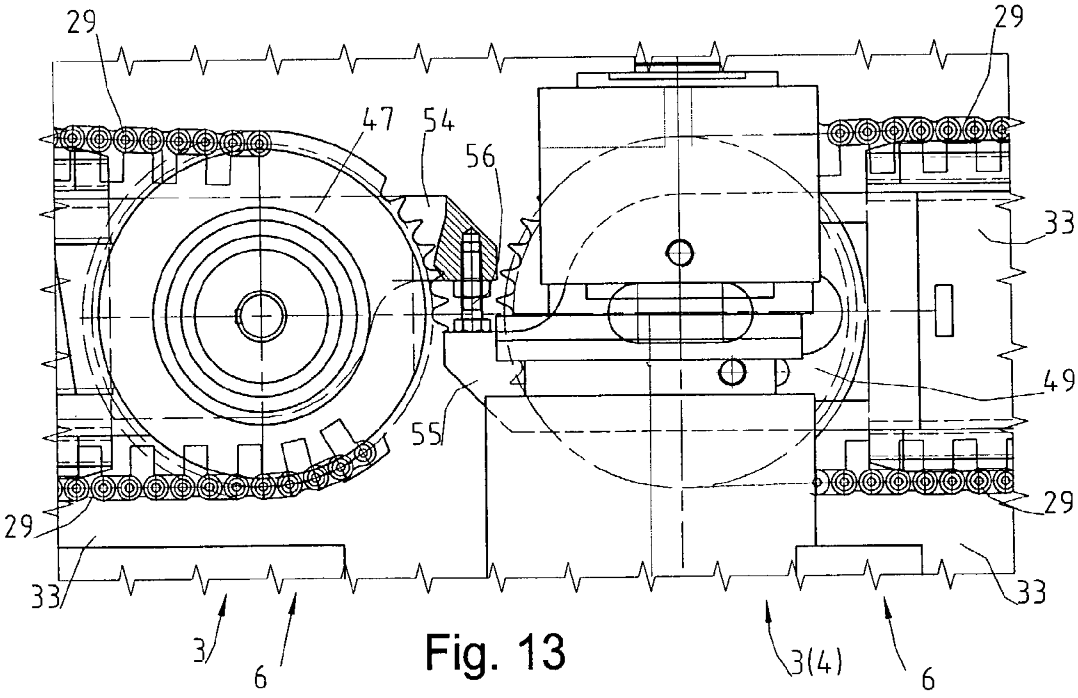
FIG. 13 same as in FIG. 11, but in side view from the opposite side, H detail.

In FIG. 11, FIG. 12 and FIG. 13, there is shown the joint between two consecutively placed entrance conveyors 3, being completely identical to the joint between the entrance conveyor 3 and the exit conveyor 4, and likewise identical to the joint between two exit conveyors 4. For better understanding of the invention, the description will be based on the joint between the entrance conveyor 3 and the exit conveyor 4, and is in force for all stated combinations of joints. At the beginning and end of each entrance conveyor 3, there is located a pair of chain wheels 47 and 48 with adjacent endless conveying chains 29 and 30 in the way that one longitudinal half forms the side chain unit 6, and the other longitudinal half the side chain unit 7. A pair of chain wheels 47, 48 is placed horizontally perpendicular to the longitudinal axis of the entrance conveyor 3. The side chain unit 6 is thus formed by a pair of chain wheels 47, being one to the other optionally distant in the longitudinal direction, and they are encircled and connected by the uniform endless conveying chain 29. Identical to this, the side chain unit 7 of the entrance conveyor 3 is formed by a pair of chain wheels 48 encircled and connected by the uniform endless conveying chain 30. Side chain units 6 and 7 are one to the other distant in the transverse direction in an optional horizontal distance that represents the working width of the entrance conveyor 3.

As described for the entrance conveyor 3, it is likewise effective for the exit conveyor 4 by having at its beginning and end a pair of chain wheels 49 and 50 with adjacent endless conveying chains 29 and 30, which in this way form the side chain units 6 and 7. A pair of chain wheels 49, 50 is placed opposite to the longitudinal axis of the entrance conveyor 3 equally as previously described for a pair of chain wheels 47, 48. Likewise in this case, the side chain unit 6 is in the longitudinal direction formed by a pair of interactively optionally distant chain wheels 49 encircled and connected by the uniform endless conveying chain 29. Identical to this, the side chain unit 7 of the exit conveyor 4 is formed by a pair of chain wheels 50 encircled and connected by the uniform endless conveying chain 30.

As already described above, two adjacent and in a given longitudinal sequence placed side chain units 6 and/or 7 are both at the entrance conveyor 3, as well as at the exit conveyor 4 in the longitudinal direction interactively connected in the way described below. This description is also consequently effective for the longitudinal combination of side chain units 6 and/or 7 between the entrance conveyor 3 and the exit conveyor 4, irrespective of the number of the former and/or the latter inside the conveying line 1. As already previously said, this joint description will be shown on a consecutive longitudinal join or joint respectively of two adjacent connecting side chain units 6 and two adjacent connecting side chain units 7, effective both for the consecutive structure of two or more entrance conveyors 3 and/or two or more exit conveyors 4, as well as for their interactive combination.

Side chain units 6 of the entrance conveyor 3 and of the exit conveyor 4, placed in a regular sequence, are connected over the adjustable screw 56 inserted in the cantilever 54 on the chain wheel 47, and it juxtaposes to the cantilever 55 on the chain wheel 49. Thus, each last chain wheel 47 of the previous entrance conveyor 3 and/or the exit conveyor 4 is equipped with the cantilever 54 and the adjustable screw 56, and each first chain wheel 49 of the following entrance conveyor 3 and/or the exit conveyor 4 is equipped with the cantilever 55. As already said, the adjustable screw 56 is preferentially inserted in the cantilever 54 in the way that it is placed perpendicular to the opposite edge of the cantilever 55 and that it can be regulated. In some other feasibility example, the described can also be implemented otherwise. Likewise, that cantilevers 54 and 55 are inverted and that the adjustable screw 56 is inserted in the cantilever 55 and placed on the cantilever 54. Thus, side chain units 6 in the described example form a half of the entrance conveyor 3 or exit conveyor 4 respectively.

It is similarly effective for side chain units 7, which form the other half of the conveyor 3 and/or 4 in the way that cantilevers 51 and 52 with the adjustable screw 53 on the chain wheel 48 or 50 are mirror placed as to previously mentioned cantilevers 54 and 55 at side chain units 6. Likewise in this case, the cantilevers 51 and 52 can be constructed otherwise, inverted, and with the adjustable screw 53 in the cantilever 52.

It is effective for each entrance and exit conveyor 3 and 4 inside the conveying line 1 that the adjustment of side chain units 6 and 7 is enabled by the mechanism 8 with plain bearings 15 and 16, and by the elastic coupling 28, and the required working elasticity of side chain units 6 and 7 is provided by the elastic insertion 20 inside the side chain unit 7. The vertical pressing conveyor 9 adjustment is enabled by the mechanism 10, and its working elasticity by the elastic insertion 77 inside the pressing conveyor 9.

Figure 14:
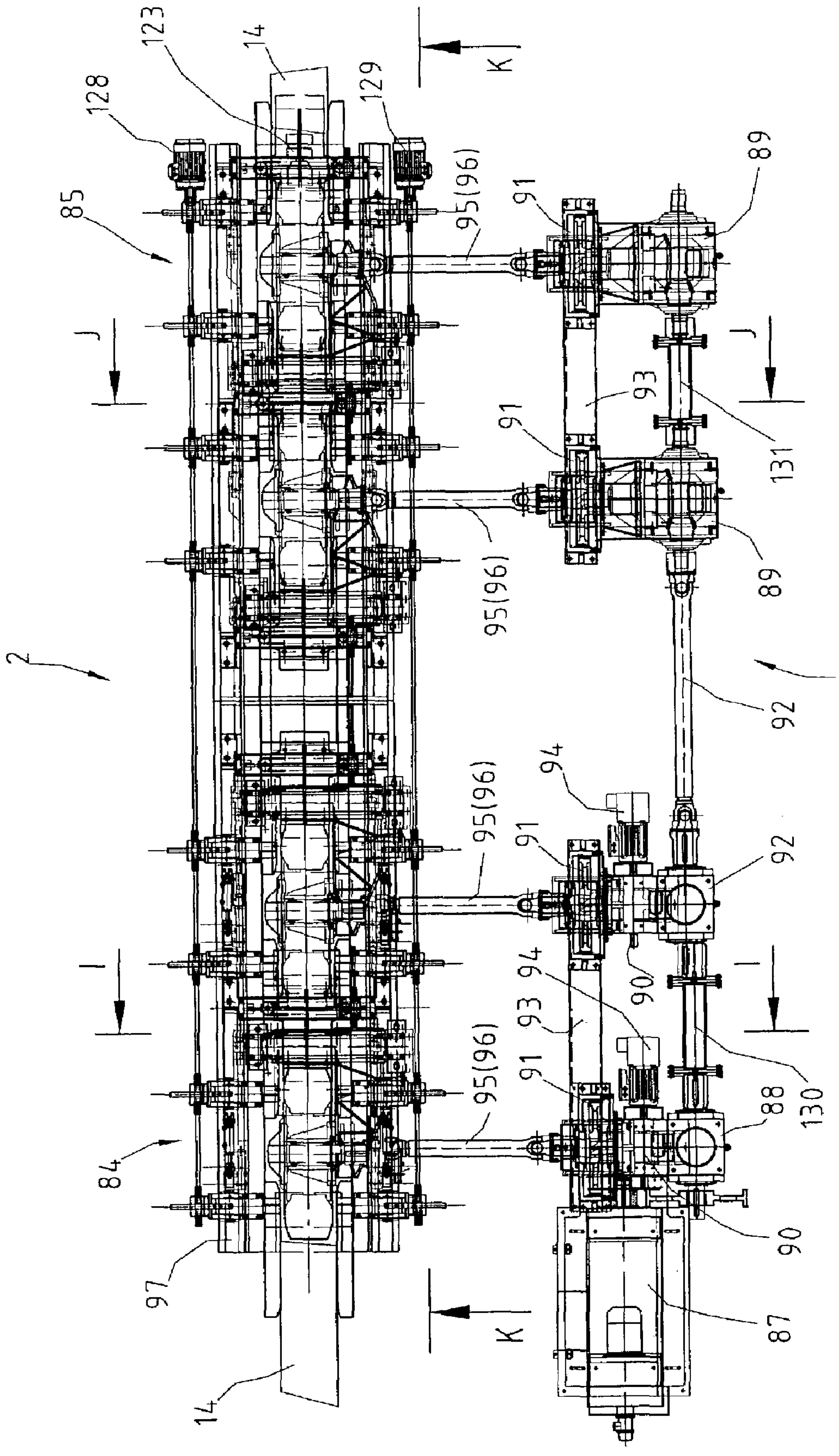
FIG. 14 flow press entrance and exit part according to the invention, in plan view.
Figure 15:
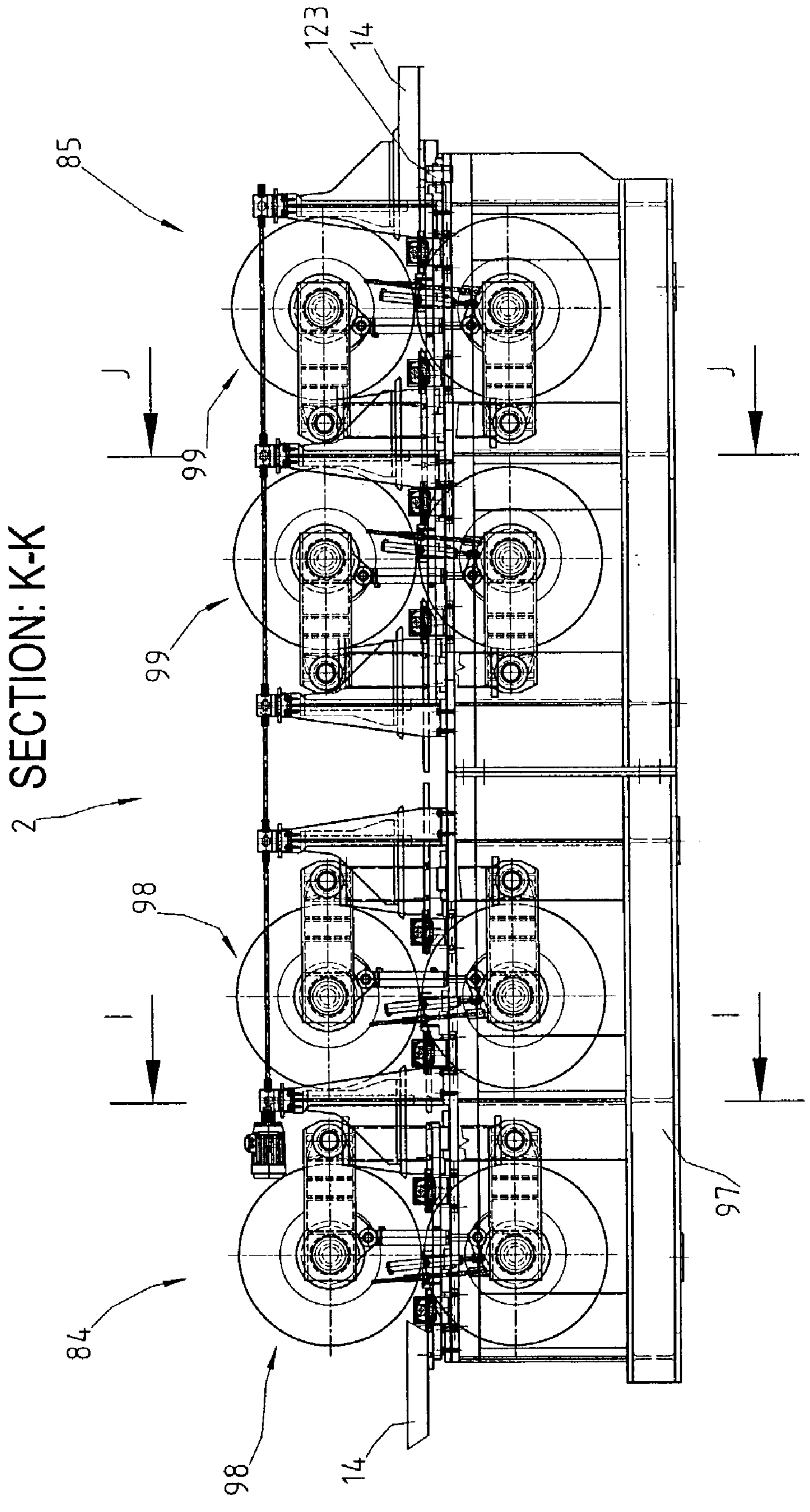
FIG. 15 same as in FIG. 14, but in side view and in K-K section.
Figure 16:
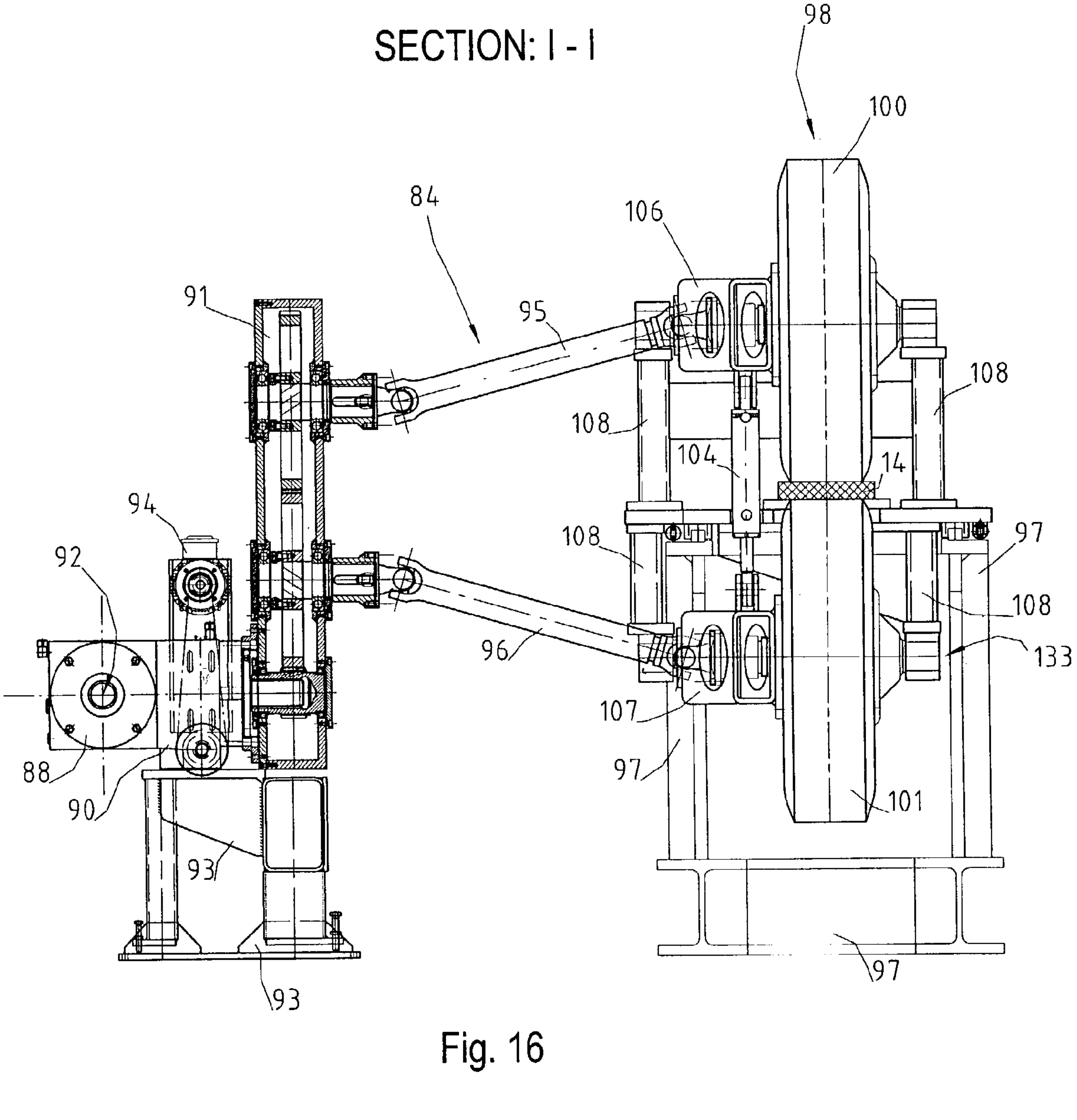
FIG. 16 flow press entrance part in I-I transverse section.
Figure 17:
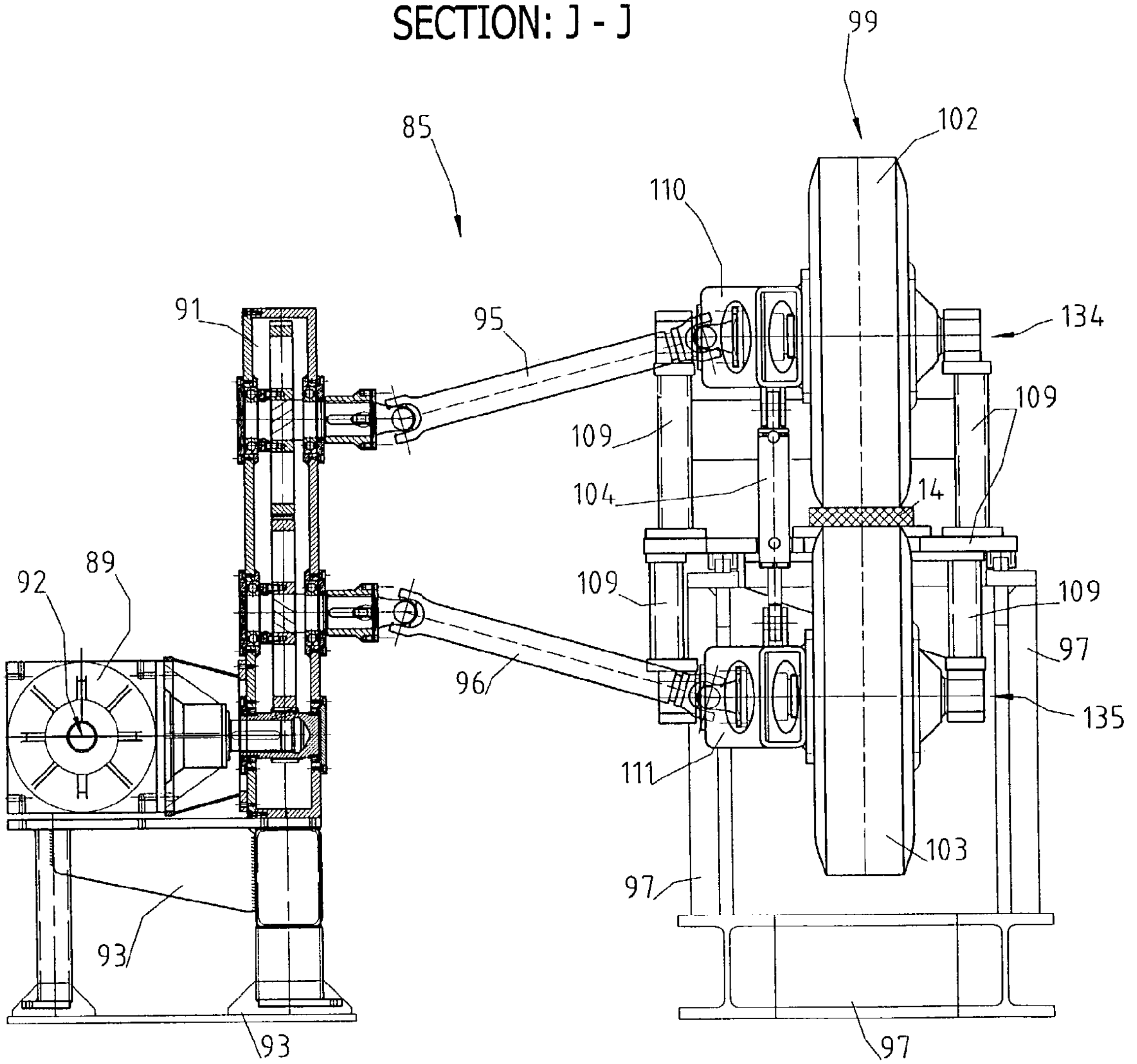
FIG. 17 flow press exit part in J-J transverse section.

The conveying line 1 is further followed by the flow press 2. As shown in FIG. 14 and FIG. 15, the flow press 2 essentially consists of at least one or more entrance units 84 and at least of one or more exit units 85, which follow each other in a regular linear flow sequence inside the common longitudinal axis, and are placed onto the fixed housing 97. At the end of the housing 97 or close behind the last exit unit 85, there is placed the force meter 123. To each entrance unit 84, there belong at least two or more pushing wheel pairs 98, and to each exit unit 85 at least two or more pushing wheel pairs 99, and both units 84 and 85 preferentially have the same driving coupling 86 placed onto the housing 93.

The flow press 2 is driven by the driving coupling 86 by means of the driving motor 87. In principle, the driving coupling 86 is constructed to drive each pushing wheel pair 98 inside the entrance unit 84 separately, and also simultaneously each pushing wheel pair 99 inside the exit unit 85 in the way described below.

The driving motor 87 drives angular gears 88 for driving pushing wheel pairs 98 inside the entrance unit 84, and it simultaneously drives angular gears 89 for driving pushing wheel pairs 99 inside the exit unit 85. It means that each pushing wheel pair 98 has its own angular gear 88, and that each pushing wheel pair 99 has its own angular gear 89. Angular gears 88 are interactively connected with transmission shafts 130, and angular gears 89 are connected with transmission shafts 131. Angular gears 88 are connected with angular gears 89 by the transmission shaft 92 in the way that it connects the last angular gear 88 with the first angular gear 89. In case of the pushing wheel pairs 98 drive of the entrance unit 84, each angular gear 88 is joined with the differential gear 90 having its own drive 94. The differential gear 90 is further joined with the toothed gear 91, which is rotationally connected with the pushing wheel pair 98 formed by the upper wheel 100 and the lower wheel 101 over Cardan shafts 95 and 96, and cranks 106 and 107. Thereby, the Cardan shaft 95 is joined with the upper wheel 100, and the Cardan shaft 96 with the lower wheel 101. Between cranks 106 and 107, there is inserted the cylinder 104 to regulate pressure between the upper wheel 100 and the lower wheel 101. The crank 106 is over the rotating point 132 linked to the housing 108 of the pushing wheel pair 98 of the entrance unit 84.

In case of the pushing wheel pairs 99 drive of the exit unit 85, each angular gear 89 is likewise joined with its own toothed gear 91 without having its own drive. The toothed gear 91 is rotationally connected with the adjacent pushing wheel pair 99 formed by the upper wheel 102 and the lower wheel 103 over Cardan shafts 95 and 96, and cranks 110 and 111. Thereby, the Cardan shaft 95 is joined with the upper wheel 102, and the Cardan shaft 96 with the lower wheel 103. Between cranks 110 and 111, there is inserted the cylinder 104 to regulate pressure between the upper wheel 102 and the lower wheel 103. The described is shown in FIG. 14 to FIG. 17 inclusive.

Figure 18:
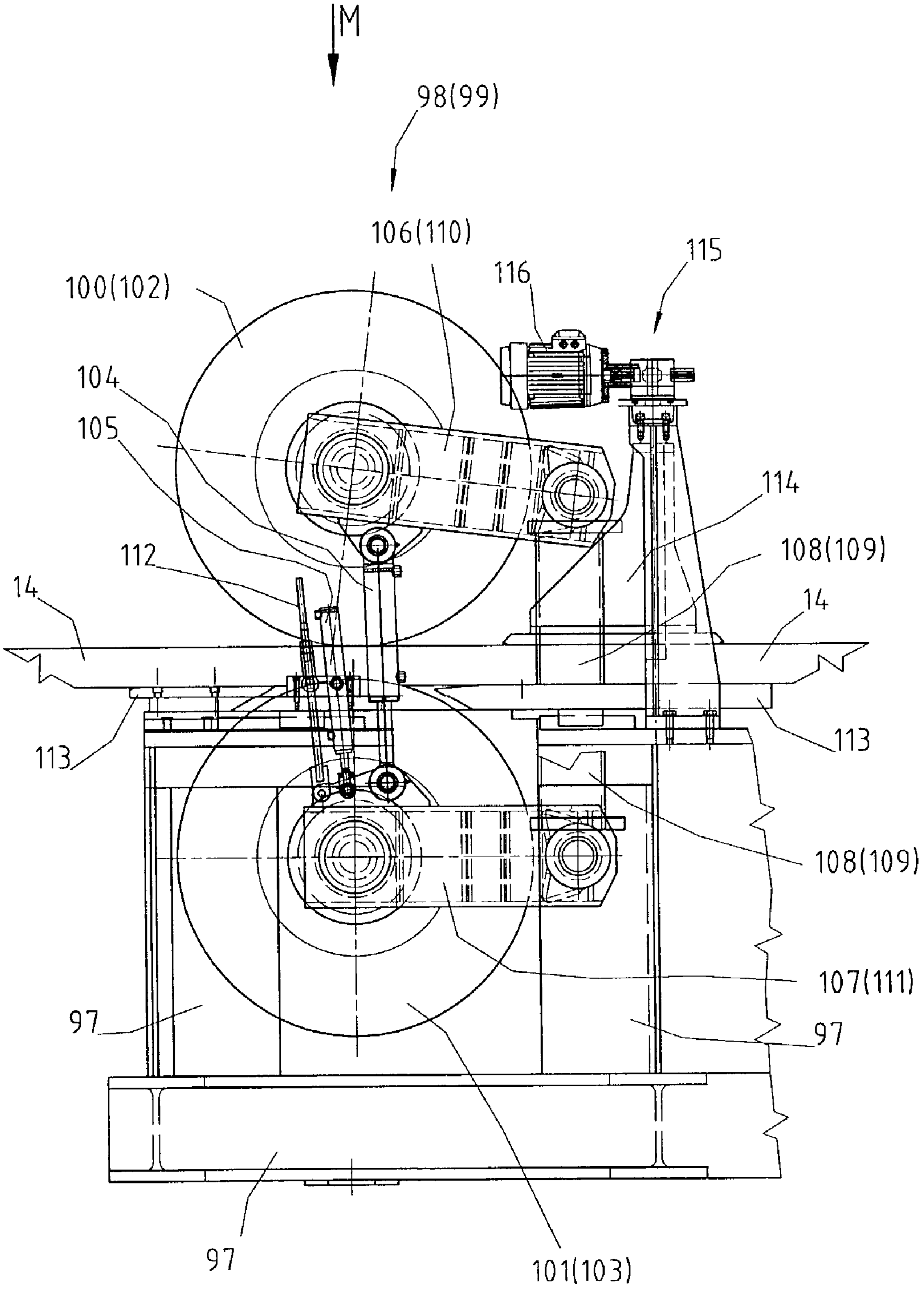
FIG. 18 pressing wheels pair of the flow press entrance and/or exit part in side view.

It is evident from FIG. 18 that in the pushing wheel pair 98, the crank 106 is with one end flexibly joined with the upper wheel 100, and with the other end it is over the rotating point 132 flexibly fastened to the housing 108. The crank 107, which is with one end flexibly joined with the lower wheel 101, is with the other end over the rotating point 133 likewise flexibly fastened to the housing 108. The housing 108 on the fixed housing 97 of the flow press 2 is constructed in the way that it is linear movable in the sense of a plain bearing. The required pressure between the upper wheel 100 and the lower wheel 101 is regulated by the cylinder 104, which is with one end flexibly clamped into the crank 106 of the upper wheel 100, and with the other end it is likewise flexibly clamped into the crank 107, which belongs to the lower wheel 101. The correct position of the lower wheel 101 is provided by the cylinder 105, which is flexibly fastened between the housing 97 and the crank 107. To adjust the distance between the upper wheel 100 and the lower wheel 101, the mechanism 112 is applied, oscillating fastened between the housing 97 and the crank 107.

Similar to the pushing wheel pairs 98 of the entrance unit 84, there is in FIG. 18 shown simultaneously the pushing wheel pair 99 of the exit unit 85, and which is preferentially implemented in the identical way. Thus, likewise in this case the crank 110 of the upper wheel 102 flexibly joined with the housing 109 over the rotating point 134. The crank 111 is likewise flexibly fastened to the housing 109, but over the rotating point 135. The correct pressure between the upper wheel 102 and the lower wheel 103 is regulated by the cylinder 104, which is with one end flexibly fastened to the housing 109 over the rotating point 134, while with the other end it is flexibly fastened to the crank 111 over the rotating point 135. The correct situation or position respectively of the lower wheel 103 is determined by the cylinder 105, which is flexibly fastened between the fixed housing 97 and the flexible crank 111. The mechanism 112, oscillating fastened between the housing 97 and the crank 111, is intended for adjustment of the interactive distance between the upper wheel 102 and the lower wheel 103 of the pushing wheel pair 99.

By the crank 106 or by the crank 110 respectively, there is vertically placed the pressing foot 114 with the mechanism 115 for its adjustment, driven by the drive 116. It is therefore in force that each pressing foot 114 has its mechanism 115, and all mechanisms 115 are driven by the joint or central drive 116 respectively. The sliding plate 113 fastened to the housing 97 is placed between the adjacent pair of cranks 106, 107, or cranks 110, 111 respectively.

Figure 19:
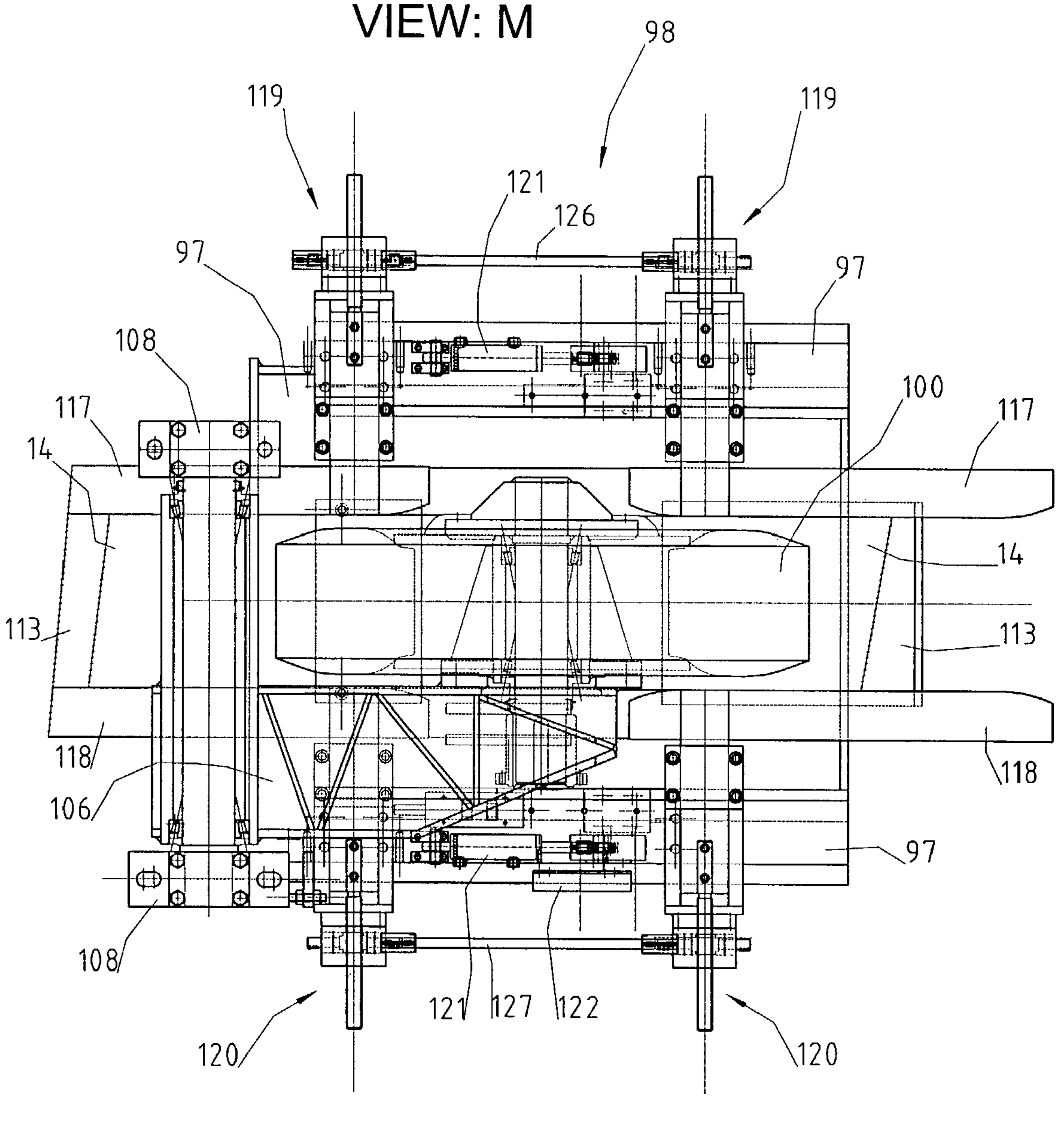
FIG. 19 same as in FIG. 18, but in plan view.
Figure 20:
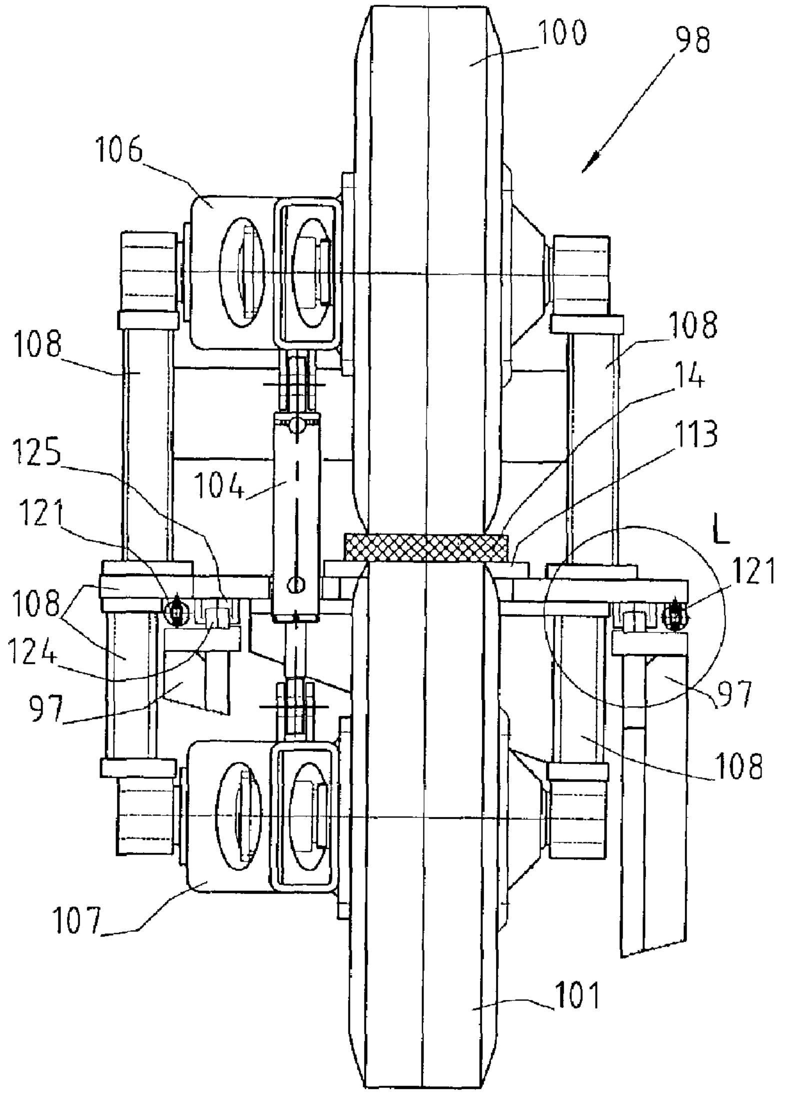
FIG. 20 same as in FIG. 18, but in front view.
Figure 21:
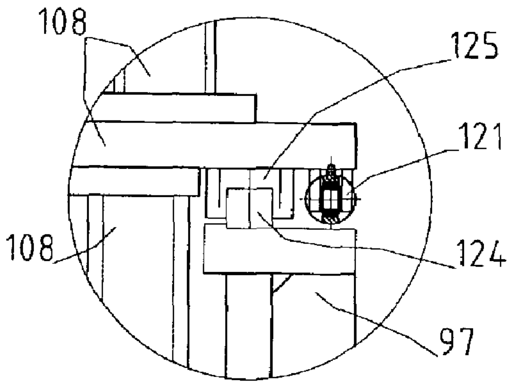
FIG. 21 linear guiding lath of the pressing wheels pair in L detail.

In FIG. 19, FIG. 20 and FIG. 21, it is shown that the housing 108 of the pushing wheel pair 98 is linked to the fixed housing 97 of the flow press 2 in the way that at least one linear guiding lath 124 is fixedly placed between the housing 108 and the housing 97, hence on both sides and along the working stroke length of the pushing wheel pair 98. Over each linear guiding lath 124, there are at least two linear bearings 125 placed on the housing 108, and likewise on both sides and along the entire pushing wheel pair 98. The cylinder 121 is flexibly clamped between the housing 97 and the housing 108, hence at least one on each of both sides of the pushing wheel pair 98. It is in force that each coupling of the pushing wheel pair 98 has its own cylinder 121 to regulate its horizontal shift, a pair of linear guiding laths 124 and adjacent pairs of linear bearings 125.

Along the sliding plate 113 and parallel to it, there run two side laths 117 and 118 optionally distant one to the other. The mechanism 119 is applied to adjust the side lath 117, and the mechanism 120 to adjust the side lath 118, hence along the entire length of the flow press 2. Individual mechanisms 119 are interactively joined by rods 126 and driven by the drive 128. Likewise, individual mechanisms 120 are interactively joined by rods 127 and driven by the drive 129.

As to the previously described, it is in force that a pair of hydraulic cylinders 121 for its horizontal motion also belong to each pushing wheel pair 98 inside the entrance unit 84. Each pushing wheel pair 98 represents an independent closing whole, and pushing wheel pairs 98 are not interactively connected, but are each completely separately constructed. This enables pushing wheel pairs 98 to move inside the entrance unit 84 in the horizontal direction fully autonomously, independently, and differently one from the other.

It is completely different with pushing wheel pairs 99, which are interactively rigidly connected inside the exit unit 85 in the way that their motion in the horizontal direction is uniform, synchronous or harmonious respectively.

Behind the last pushing wheel pair 99, there is as a rule placed the force meter 123 having completely the same role as hydraulic cylinders 121 and shift-meter 122 at the pushing wheel pair 98. It is in force that the force meter 123 is before the pressing start-up adjusted to a designated force, the value of which mainly depends on the workpiece 14 section, on teeth shape on front joints, and on material from which the workpiece 14 is made.

There further follows a procedure description of the front joining and sticking of toothed surfaces between oblong in a row traveling wood workpieces 14 by the machine according to the invention. In this description, there will in detail be described its role and innovative elastic construction, which represents the core of the invention, and which can enough clearly be described only if the procedure and traveling of workpieces 14 through this machine are monitored.

Workpieces 14, which are already previously front toothed on both sides, with teeth of different profiles on which the adequate glue is previously deposited, come in a row from a machine designed for their production, being not the subject of this invention and thus not described. In this way pre-worked workpieces 14 are as a rule of equal thicknesses and widths, but they can be of different lengths. Preferentially, they are of four-cornered, but they can also be of other optional sections. One after another they come in a row to the machine according to the invention in the way that they first come to its conveying line 1, and along it further in and through the flow press 2, as the conveying line 1 and the flow press 2 are interactively in a flow connection. The aforesaid is described below.

By entering the conveying line 1, workpieces 14 first come in a given linear and co-axial sequence into the entrance conveyor 3 Front toothed made surfaces of workpieces 14 thus follow each other in a row, one at the distance from the other of the length of the same workpiece 14, or of the size of spacing between the adjacent workpieces 14 that follow each other. Thereby, as a rule the workpieces 14 are placed and slide with their one larger surface along the bearing laths coupling 19, and their joint longitudinal axis is parallel to the longitudinal axis of the conveying line 1.

Inside the entrance conveyor 3, the workpieces 14 are located in the embrace of side chain units 6 and 7, and of the pressing conveyor 9, which press on them with a fixed force being previously adjusted to the optimal transverse section of workpieces 14. Side chain units 6 and 7 driven by drives 11 and 12, and the pressing conveyor 9 driven by the drive 13 push workpieces 14 over the adjacent endless conveying chains 29, 30 and 72 towards the exit conveyor 4, and then further towards the flow press 2.

The said preliminary adjustment is performed prior to the machine start-up according to the invention, thus prior to start conveying workpieces 14 along the conveying line 1 or through the entrance conveyor 3 and exit conveyor 4 respectively. Thereby, the side chain units 6 and 7 adjustment is performed by the mechanism 8 and elastic coupling 28, by allowing for the fixed width of workpieces 14 by means of worm gears 26, which follow each other in a given sequence, and they are interactively connected by the drive-shaft 136 driven by its own drive being not presented. It means that each worm gear 26 is equipped with the thread spindle 25 having the elastic coupling 28 at the other end. By rotating the thread spindle 25, the nut 27 placed inside the elastic coupling 28 does not move and is always in the same position. By rotating the thread spindle 25, the side chain unit 6 also move to the proper direction, inwards or outwards, what is enabled by the plain bearing 15 and the slide 17. By rotating the thread spindle 25, there is simultaneously performed a preliminary adjustment of the side chain unit 7 by means of the nut 27 connected with it over the cantilever 24. Thereby, the transverse shift of the side chain unit 7 is enabled by the plain bearing 16 and the slide 18. The simultaneous preliminary adjustment of side chain units 6 and 7 is enabled by the thread spindle 25 with the left and right thread, whereby on the thread left part there is the nut 27, and on the thread right part the nut 59, or inversely. Thereby, it is important that at the thread spindle 25 rotating to one direction, the side chain units 6 and 7 uniformly approach, and at rotating to the opposite direction they uniformly digress. The rule applies that side chain units 6 and 7 are in each position, where they are currently located, equally distant from the longitudinal central axis of workpieces 14.

After the preliminary adjustment of side chain units 6 and 7, there follows the pressing conveyor 9 adjustment by means of its mechanism 10, namely depending on thickness and height of workpieces 14. The rule applies that each entrance conveyor 3 and each exit conveyor 4 have at least two mechanisms 8 to adjust side chain units 6 and 7, and at least two pressing conveyors 9 with the mechanism 10, and simultaneously with the entrance conveyors 3 adjustment the exit conveyors 4 adjustment is likewise performed. Thus, prior to the pressing procedure start, the entire conveying line 1 is adjusted.

Thereby, a rule applies in practice that described preliminary adjustments of the conveying line 1 are performed in the way that the distance between side chain units 6 and 7, and the distance between the pressing conveyor 9 and the bearing laths coupling 19 are a bit smaller than the width and height of workpieces 14. In this way, the pressure to the side surface and front surface of workpieces 14 is increased, what is also the condition for the required shift of workpieces 14 through the entrance conveyor 3 and the exit conveyor 4. Thereby, the conveying line 1 with entrance conveyors 3 and exit conveyors 4 is constructed to enable yet allowed deviations of workpieces 14 by width and thickness, as well as their curvature along the longitudinal axis. These deviations are possible and not disturbing because the elastic insertion 20 is inserted inside the side chain unit 7, or between the frame 34 and the bearing profile 36 of the endless conveying chain 30. Due to the side pressure between the workpiece 14 and side chain units 6 and 7, the elastic insertion 20 is compressed as much as there amounts the difference between the previously adjusted distance between side chain units 6 and 7, and the actual width of the workpiece 14, which travels through. Thereby, the bearing profile 36 slides along the frame 34 of the endless conveying chain 30 guided by the guide pin 37 and secured by the nut 38. Thus, the nut 38 is intended for adjustment of the transverse stroke length of the bearing profile 36. The distance between the side chain units 6 and 7 is namely adjusted prior to the pressing and sticking procedure to the average anticipated width of workpieces 14.

Previously stated deviations of workpieces 14 are not disturbing likewise because their deviation as to thickness or height respectively is allowed by the vertical pressing conveyor 9, which presses to the upper, as a rule larger surface of workpieces 14. As a matter of fact, this is enabled by the elastic insertion 77, which is inserted inside the empty space between the frame 74 and the bearing profile 75, and it is placed on the spacer 76. Namely, the bearing profile 75 slides along the frame 74 inside the area determined by the adjustable screw 78. The elastic insertion 77 is placed on the spacer 76 for the reason that the elastic insertion 77 inside the frame 74 and the bearing profile 75 cannot move.

In case that the longitudinal curvature of workpieces 14 is higher than allowed, the curved side of the workpiece 14 causes even higher pressure to the side chain unit 6 or 7, depending on which side the workpiece 14 is curved. For this reason, inside each entrance conveyor 3 the side chain units 6 and 7 make a simultaneous and parallel shift to the curvature direction. Thereby, the thread spindle 25 of the mechanism 8 in common with the nut 59 of the elastic coupling 28 likewise shifts to the said curvature direction. This enables pressure springs 64 and 65 located on one and the other side of the nut 59 to return side chain units 6 and 7 to the previously adjusted or the starting position respectively after the increased side force operation stop due to the workpiece 14 larger curvature. Thereby, it is important that the linear motion of pressure springs 64 and 65 is limited by the crank 58 on the nut 59, which extends into the groove 137 of the plate 57.

The procedure of workpieces 14 traveling through the exit conveyor 4 is almost identical to the previously described procedure of workpieces 14 pass through the entrance conveyor 3. The only difference is that workpieces 14 inside the exit conveyor 4 are simultaneously encircled between side chain units 6 and 7, between the pressing conveyor 9, and additionally between the bearing conveyor 66. The latter has the duty to bear workpieces 14 and provides their fluent, undisturbed and continuous traveling through the exit conveyor 4.

By each workpiece 14 pass from one to the other entrance conveyor 3, or from one to the other exit conveyor 4, and/or from the entrance conveyor 3 to the exit conveyor 4, as a rule the workpieces 14 follow each other in a given linear sequence in the way that they are axially aligned at length. In case when an axial shift occurs in a series of workpieces 14, this shift can also be reflected in the front toothed surfaces joint of two in a row adjacent workpieces 14. To avoid this event, the front alignment of these workpieces 14 should be performed at the pass from the entrance conveyor 3 to the exit conveyor 4. This purpose is served by adjustable screws 53 and 56 placed between the fixed cantilever 51 and the tension cantilever 52, or between the fixed cantilever 54 and the tension cantilever 55 respectively. Cantilevers 51, 52, and 54 and 55 are located directly in passing areas between entrance conveyors 3, and likewise between exit conveyors 4, as well as between the former and the latter. To come to the mentioned alignment of workpieces 14, the entire entrance conveyor 3 is laterally shifted, namely for the axial deviation difference between the preceding and following workpieces 14. It is equally effective for the exit conveyor 4. The mentioned side shift and consequently the axial alignment of workpieces 14 are enabled by fixed pins 21 and adjacent sliding-bushes 39, and fixed pins 22 and adjacent sliding-bushes 40 at the exit section of entrance conveyors 3, as well as of exit conveyors 4. At the entrance section of entrance conveyors 3 and exit conveyors 4, this side shift is enabled by fixed pins 43 and adjacent sliding-bushes 46, and fixed pins 44 and adjacent sliding-bushes 45.

In the previously described way, there is each time adjusted the actual longitudinal axis of conveyed workpieces 14 through conveyors 3 and 4, which after the adjustment again follow each other towards the same longitudinal axis direction. After the carried out adjustment of workpieces 14, the elastic couplings 28 provide for returning the conveyors 3 and 4 to the starting position, whereby the elastic couplings 28 are as a rule placed on the entrance and exit section of each individual entrance conveyor 3, and of each exit conveyor 4.

When workpieces 14 leave the conveying line 1 in a row, one after the other in a flow and linear sequence pass into the area of the flow press 2, where they are embraced by at least one or more pushing wheel pairs 98. Each pushing wheel pair 98 operates by itself, and is also by itself movable in the longitudinal direction, as pushing wheel pairs 98 are not interactively connected.

The intermediate distance between the upper wheel 100 and the lower wheel 101 should be adjusted prior to start the pressing procedure, namely depending on the workpieces 14 thickness. It is adjusted by mechanisms 112, what is equally effective for the distance between the wheels 102 and 103 of pushing wheel pairs 99 inside the exit unit 85 that follows the entrance unit 84. In this preliminary adjustment procedure, there is also performed the adjustment of pressing feet 114, namely along the entire length of the flow press 2. Each pressing foot 114 has its own mechanism 115 for adjustment, and they are all driven by the central drive 116. There follows the side laths 117 adjustment by mechanisms 119, and side laths 118 by mechanisms 120, likewise along the entire length of the flow press 2 and with an objective of workpieces 14 good guiding. Individual mechanisms 119 are interactively joined by the rod 126 and centrally driven by the drive 128, while mechanisms 120 are interactively joined by the rod 127 and driven by the joint drive 129. All required adjustments of the flow press 2 that are performed before pressing are carried out in the described way, what is also effective for the afore described conveying line 1 adjustments.

As already said, by passing from the conveying line 1 to the flow press 2 the workpieces 14 come first to the entrance unit 84 embrace. By entering into its first pushing wheel pair 98, the workpieces 14 are further pushed by the last exit conveyor 4 of the preliminary conveying line 1, whereby the pushing wheel pair 98 moves along the linear guiding lath 124 and the linear plain bearing 125 towards the workpieces 14 conveying direction. Owing to this move, the pressure in the cylinder 121 is increased, and is transferred to the drive 94 of the differential gear 90 in a form of a signal over the shift-meter 122. Owing to the pressure increase in the cylinder 121, in this case the drive 94 has a task to increase the pushing wheel pair 98 revolutions number, which in this way rotate faster. The workpiece 14 enters the first pushing wheel pair 99 inside the exit unit 85 with this increased speed. It is in force that contrary to pushing wheel pairs 98, all pushing wheel pairs 99 rotate always with a constant speed, and they are likewise movable in the longitudinal direction along the linear guiding lath 124 and linear plain bearings 125. All pushing wheel pairs 99 are interactively mechanically joined to operate as a uniform coupling.

The above described effect of the higher or increased respectively speed of pushing wheel pairs 98, and opposite to it, the lower or constant respectively speed of pushing wheel pairs 99 causes that the adjacent ends of two in a consecutive linear row moving workpieces 14 compress with toothed front surfaces, and thus they join and simultaneously stick. Thereby, under the meaning of adjacent ends of two workpieces 14 one understands the last front toothed surface of the previous one and the first front toothed surface of the workpiece 14 that follows the previous one in a row.

By joining front profile surfaces of two in a row traveling workpieces 14, inside the exit unit 85 the pressure is increased in the cylinder 121, which detects this pressure change over the force meter 123, and in the impulse form it transfers it to drives 94 of the differential gear 90, and from there further to the pushing wheel pair 98. In this way, the speeds between the entrance unit 84 and the exit unit 85 are regulated during the pressing procedure. It means that this pressure transfer to the pushing wheel pair 98 is carried out over the differential gear 90, toothed gear 91, Cardan shaft 95, and Cardan shaft 96.

When workpieces 14 travel through the flow press 2, they are placed on the sliding plate 113, whereby they are laterally guided by side laths 117 and 118, and from the top they are held and guided by the pressing foot 114, and thus they all together form a conveying channel or a tunnel respectively through which the workpieces 14 travel.

Figure 22:
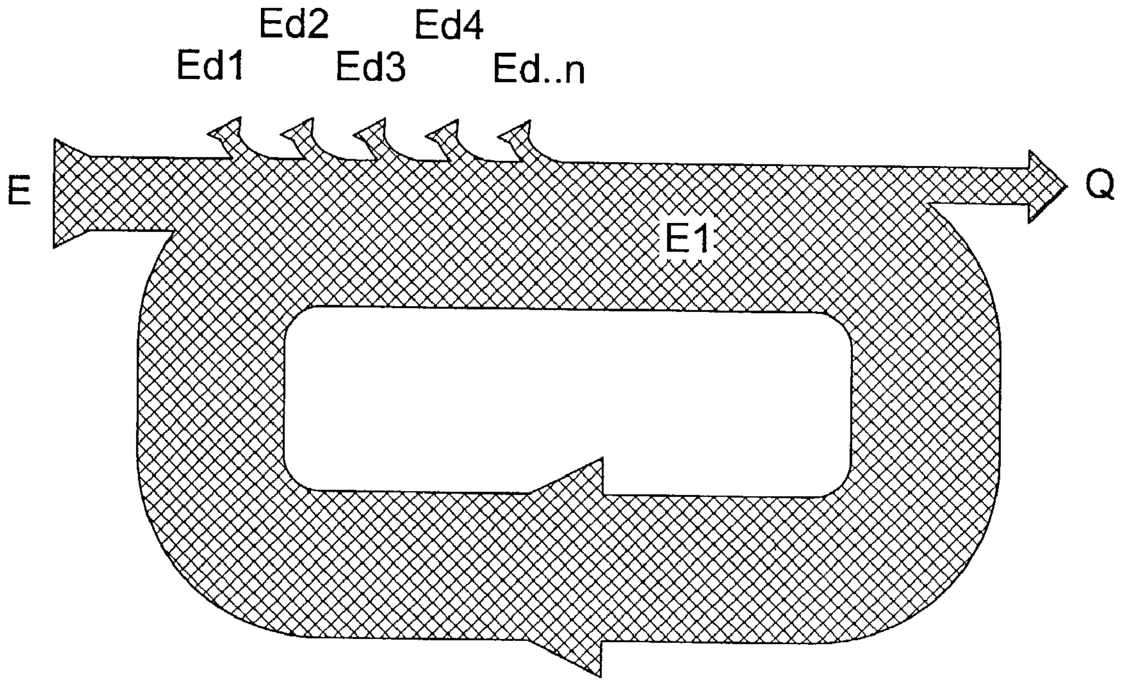
FIG. 22 energy diagram of the flow press according to the invention.

In FIG. 22, there is shown the energy diagram of the entire supplied energy E efficiency for pressing workpieces 14 in the flow press 2 of the machine according to the invention, obtained on the basis of empirical practical tests. It is evident from the diagram that for efficient flow operation of the flow press 2, it is required to supply a relatively very small quantity of drive energy E, which during the pressing procedure is additionally supplied by energy Ed1, Ed2 . . . Edn, transferred over the electromotor drive 94 on the differential gear 90, whereby the drive 94 gets an impulse from the force meter 123. Further energy characteristic of the flow press 2 is in the fact that the major part of entire supplied energy E is employed as efficient energy E1 for pressing workpieces 14, and its smaller part is lost in the thermal energy Q form, generated by friction among elements of the flow press 2 and workpieces 14. Namely, it applies that E=E1+Q and thus E1=E−Q. Likewise, energy characteristic of the flow press 2 is in the fact that during pressing the efficient energy E1 continuously returns to its entrance part, and it thus forms a constant circular path.

Figure 23:
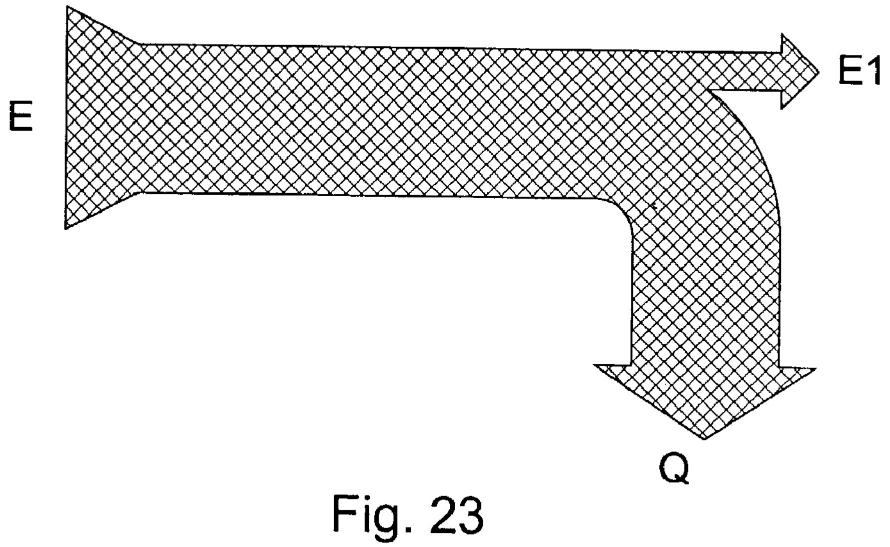
FIG. 23 energy diagram of the flow press according to the known solution.

In FIG. 23, there is shown the energy diagram of the entire supplied energy E efficiency by the press according to the known already in the preamble described solution, being diametrically opposed to the previously mentioned diagram in FIG. 22. It is characteristic for the press energy diagram according to the known solution that the major part of entire supplied energy E represents a loss in the thermal energy Q form, being the result of friction among workpieces and elements of this known press during pressing. Analogue to this, the share of efficient energy E1 required for the pressing performance is minimal.

Both diagrams comparison evidently shows that the flow effectiveness, power, energy efficiency and affordability is on the side of the flow press 2 according to the invention. For its efficient operation, it is required to supply less energy E, being also rationally employed during the pressing procedure, as thermal losses Q are minimal, and the actively efficient energy E1 is optimally maximal. In short, it means that it is in force for known presses that Q>E1, while it is in force for the flow press 2 according to the invention that E1>Q. Namely, it is known that E=E1+Q.

The invention claimed is:

1. A machine for front joining and sticking of oblong wood workpieces by toothed front joints, the machine comprising:

slides;

an elastic coupling;

a first adjustable screw;

a second adjustable screw;

entrance conveyors and exit conveyors that follow each other in a row, said entrance and exit conveyors comprising side chain units and pressing conveyors, said side chain units and said pressing conveyors forming a traveling channel for workpiece flow, said side chain units comprising a bearing profile, a frame, a linearly movable guide pin with a nut, a plain bearing and at least one elastic insertion, said frame and said bearing profile of said side chain units of said entrance conveyors or said exit conveyors defining an empty space at least one said elastic insertion being inserted in said empty space, said bearing profile having a first edge and a second edge, said first edge of bearing profile being joined with the linearly movable guide pin with the nut and said second edge being fixed to the plain bearing, said bearing profile being linearly movable on the slides;

said pressing conveyors comprising a pressing conveyor frame, a pressing conveyor elastic insertion and a pressing conveyor bearing profile, said pressing conveyor frame and said pressing conveyor bearing profile defining an empty pressing conveyor space at least one said pressing conveyor elastic insertion being inserted into said empty pressing conveyor space; and a mechanism comprising a thread spindle, said mechanism flexibly joining each individual pair of side chain units inside said entrance conveyors and said exit conveyors at least one said elastic coupling being arranged adjacent to said thread spindle, one of said entrance conveyors being adjacent to one of said exit conveyors, each of said side units of said entrance conveyors comprising a first chain wheel, a second chain wheel, a first fixed cantilever arranged on said first chain wheel and a second fixed cantilever arranged on said second chain wheel, each of said side units of said exit conveyors comprising a third chain wheel, a fourth chain wheel, a first tension cantilever arranged on said third chain wheel and a second tension cantilever on said fourth chain wheel, said first adjustable screw being inserted between said first fixed cantilever and said first tension cantilever, said second adjustable screw being inserted between said second fixed cantilever and said second tension cantilever.

2. A machine according to claim 1, wherein said at least one elastic insertion is inserted inside side chain units, or said at least one elastic insertion is simultaneously placed inside side chain units.

3. A machine according to claim 1, wherein said at least one elastic insertion and said pressing conveyor elastic insertion comprise a hollow body formed in one piece, or said at least one elastic insertion and said pressing conveyor elastic insertion comprise several parts, of optional form and section, filled up with an optional compressible substance.

4. A machine according to claim 1, wherein each entrance conveyor and each exit conveyor has at least one said mechanism with the elastic coupling at an entrance side and an exit side.

5. A machine according to claim 4, wherein said elastic coupling consists of at least two pressure springs, one end of one of said pressure springs being adjacent to a control screw, one end of another of said pressure springs and said one end of one of said pressure springs pressing an intermediate nut by a crank, said crank having a longer end, said longer end extending into a groove in a plate.

6. A machine according to claim 1, wherein a conveying line adjustment is performed prior to working such that a first distance between said side chain units is carried out by means of the mechanism and said elastic coupling, while a second distance between the pressing conveyor and bearing laths, or bearing conveyor respectively is adjusted via said mechanism, said second distance being associated with a workpiece height, said first distance being associated with a workpiece width, whereby said first distance is less than a width of the workpieces and said second distance is less than a height of the workpieces.

7. A machine according to claim 1, wherein in case of a workpiece axial curvature, the side chain units together with the thread spindle of the mechanism and with the nut of the elastic coupling move in a curvature direction, and after an increased side force operation stop said side chain, said spread spindle and said nut return to a starting position via pressure springs, wherein an axial shift between front toothed surfaces of two workpieces on one side is prevented by said adjustable screws between two pairs of cantilevers, and on another side by sliding-bushes on adjacent pins, placed on an exit section of the entrance conveyor, or on an entrance section of the exit conveyor respectively.

8. A machine for front joining and sticking of oblong wood workpieces by toothed front joints, the machine comprising:

a joint central driving coupling;

an angular gear;

a differential gear;

a toothed gear;

Cardan shafts;

a first crank;

a second crank;

a housing;

a central working unit comprising a flow press with entrance units and exit units formed by couplings in a row of placed and driven pushing wheel pairs, said entrance units and said exit units being driven by said joint central driving coupling, said joint central driving coupling simultaneously and separately driving each of said pushing wheel pairs inside at least one of the entrance units via the angular gear, differential gear, toothed gear, and Cardan shafts, whereby said joint central driving coupling simultaneously drives each of said pushing wheel pairs inside at least one of the exit units via the angular gear, toothed gear and Cardan shafts, said pushing wheel pairs in the entrance units being formed as separated interactively disintegrated units, which move in a horizontal direction independently, said pushing wheel pairs in the exit units being interactively joined such that said pushing wheel pairs in said exit units jointly and synchronously move in the horizontal direction, said first crank being located inside each of said pushing wheel pairs, one end of said first crank being flexibly joined with an upper wheel of said pushing wheel pairs, and another end of said first crank being flexibly clamped over a rotating point to said housing, said second crank having one end thereof flexibly joined with a lower wheel of said pushing wheel pairs, and another end of said second crank being flexibly clamped over the rotating point to said housing, each pushing wheel pair comprising a first cylinder, which is flexibly clamped between said first crank and said second crank, and a second cylinder, which is flexibly clamped between one of said first crank and said second crank and the housing, said pair of wheels comprising an oscillating mechanism, said oscillating mechanism being fastened between one of said first crank and said second crank and the housing.

9. A machine according to claim 8, wherein each of said entrance units has at least two said pushing wheel pairs, and each of said exit units has at least two said pushing wheel pairs.

10. A machine according to claim 8, wherein each of said entrance pushing wheel pairs has at least one said angular gear, and each of said exit pushing wheel pairs has at least one said angular gear.

11. A machine according to claim 8, wherein one or more said angular gears are interactively joined with transmission shafts.

12. A machine according to claim 8, wherein each said differential gear has a drive.

13. A machine according to claim 8, wherein a force meter is joined with a drive of the differential gear.

14. A machine according to claim 8, wherein each coupling of the pushing wheel pair has one of said first cylinder and said second cylinder with a shift-meter, which is flexibly clamped between the housing.

15. A machine according to claim 8, wherein a pressing foot and a pressing foot drive are located along the first crank and the second crank.

16. A machine according to claim 8, wherein a distance between wheels inside the pushing wheel pair, and between other wheels inside the pushing wheel pair is adjusted by mechanisms based on a thickness of the workpieces, wherein each pressing foot along the flow press is adjusted by a pressing foot mechanism, whereby each pressing foot mechanism is driven by a central drive.

17. A machine according to claim 8, wherein workpieces passing to the entrance unit are moved via the pushing wheel pair along a guiding lath and linear bearing in a workpieces traveling direction, due to which a pressure in the first cylinder increases and said pressure is in a form of a signal transferred over a shift-meter to a drive of the differential gear such that said pushing wheel pairs start rotating faster, whereby the workpieces enter said exit unit at an increased speed, the workpieces contacting one another via said pushing wheel pairs, which rotate with a constant speed, wherein the increased speed of pushing wheel pairs in said entrance unit, compared with the constant speed of pushing wheel pairs in said exit unit causes a workpiece, which follows a previous workpiece to catch up with said previous workpiece, whereby both front toothed surfaces of adjacent workpieces compress and join, and simultaneously stick.

* * * * *